United States Patent
Gourevitch et al.

(10) Patent No.: US 10,969,907 B2
(45) Date of Patent: Apr. 6, 2021

(54) COMPENSATION TECHNIQUES FOR GRIP AND FINGER COUPLING TO ROUTING TRACES IN A TOUCH SENSOR PANEL

(71) Applicant: Apple Inc., Cupertino, CA (US)

(72) Inventors: Alexandre Gourevitch, San Jose, CA (US); Moshe Malkin, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/578,174

(22) Filed: Sep. 20, 2019

(65) Prior Publication Data

US 2020/0104027 A1 Apr. 2, 2020

Related U.S. Application Data

(60) Provisional application No. 62/737,800, filed on Sep. 27, 2018.

(51) Int. Cl.
*G06F 3/041* (2006.01)
*G06F 3/044* (2006.01)

(52) U.S. Cl.
CPC ........ *G06F 3/04186* (2019.05); *G06F 3/0412* (2013.01); *G06F 3/0446* (2019.05); *G06F 3/04164* (2019.05); *G06F 2203/04104* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |

(Continued)

FOREIGN PATENT DOCUMENTS

| | | |
|---|---|---|
| CN | 108062182 A | 5/2018 |
| JP | 2000-163031 A | 6/2000 |
| JP | 2002-342033 A | 11/2002 |

OTHER PUBLICATIONS

Final Office Action received for U.S. Appl. No. 14/474,571, dated Dec. 14, 2017, 29 pages.

(Continued)

*Primary Examiner* — Nicholas J Lee
(74) *Attorney, Agent, or Firm* — Kubota & Basol LLP

(57) ABSTRACT

Errors in touch signals due to grip and finger coupling to routing traces can be compensated. In some examples, reference traces can be provided to measure a signal contribution from a user's grip to routing traces. In some examples, shielding electrodes can be provided to reduce fringing field coupling between a user's grip and routing traces that are missing a neighboring trace. In some examples, a global correction for finger to trace coupling can be performed based on stored matrices that characterize cross-coupling between touch sensor electrodes in a touch sensor electrode array. In some examples, a determined touch location can be used to apply localized matrix correction to a subset of touch sensor electrodes in the touch sensor electrode array. In some examples, correction for multiple touch locations can be corrected in a specified order to avoid compensating for crosstalk effects of a single touch sensor electrode multiple times.

21 Claims, 18 Drawing Sheets

(56) References Cited

U.S. PATENT DOCUMENTS

| | | |
|---|---|---|
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,319,747 B2 | 11/2012 | Hotelling et al. |
| 8,400,408 B2 | 3/2013 | Hotelling et al. |
| 8,479,122 B2 | 7/2013 | Hotelling et al. |
| 8,723,830 B2 | 5/2014 | Hotelling et al. |
| 9,146,644 B2 | 9/2015 | Hershman et al. |
| 9,542,042 B2 | 1/2017 | Ksondzyk et al. |
| 9,626,061 B2 | 4/2017 | Hotelling |
| 9,645,670 B2 | 5/2017 | Khazeni et al. |
| 10,048,814 B2 | 8/2018 | Mohapatra et al. |
| 2006/0197753 A1 | 9/2006 | Hotelling |
| 2008/0309633 A1 | 12/2008 | Hotelling et al. |
| 2012/0026123 A1 | 2/2012 | Grunthaner et al. |
| 2014/0192027 A1 | 7/2014 | Ksondzyk et al. |
| 2015/0378482 A1 | 12/2015 | Portmann et al. |
| 2016/0299603 A1 | 10/2016 | Tsujioka et al. |
| 2018/0024666 A1 | 1/2018 | Marques et al. |
| 2018/0157354 A1 | 6/2018 | Blondin et al. |

OTHER PUBLICATIONS

Lee et al., "A Multi-Touch Three Dimensional Touch-Sensitive Tablet", Proceedings of CHI: ACM Conference on Human Factors in Computing Systems, Apr. 1985, pp. 21-25.
Non-Final Office Action received for U.S. Appl. No. 14/474,571, dated Mar. 30, 2017, 26 pages.
Notice of Allowance received for U.S. Appl. No. 14/474,571, dated Apr. 5, 2018, 17 pages.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Rubine, Dean H., "Combining Gestures and Direct Manipulation", CHI'92, May 3-7, 1992, pp. 659-660.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

COMPENSATION TECHNIQUES FOR GRIP AND FINGER COUPLING TO ROUTING TRACES IN A TOUCH SENSOR PANEL

CROSS REFERENCE TO RELATED APPLICATIONS

This application claims benefit of U.S. Provisional Patent Application No. 62/737,800, filed Sep. 27, 2018, the entire disclosure of which is incorporated herein by reference for all purposes.

FIELD OF THE DISCLOSURE

This relates generally to touch sensor panels, and more particularly to touch sensor panels having crosstalk between routing traces and touch sensor electrodes.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Examples of the disclosure are directed to compensation for effects of interaction between routing traces and a user's hand. In some examples, compensation traces can be added in a border region of a touch sensor panel to determine an amount of coupling between a user's grip and routing traces at an edge of the touch sensor panel. In some examples, shielding electrodes can be added near routing traces to ensure that edge routing traces have equal spacing to an adjacent trace equivalent to routing traces that are not at an edge. In some examples, a matrix compensation technique can be used to compensate for interaction between a touching or hovering object and routing traces. In some examples, the matrix compensation technique can be performed globally and independent of touch location. In some examples, the matrix compensation technique can be performed based on detected touch locations. In some examples, the matrix compensation technique can determine whether multiple touch locations are detected and perform compensation in a specified order to compensate for contributions at each of the touch locations.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates (e.g., touch electrodes) made of materials such as Indium Tin Oxide (ITO), conductive polymers, metal mesh, nanowires or nanotubes, and some touch screens can be formed by at least partially integrating touch sensing circuitry into a display pixel stackup (i.e., the stacked material layers forming the display pixels). Examples of the disclosure are directed to various single layer touch sensor panel architectures in which touch nodes including drive, sense, floating and/or ground electrodes are disposed in a single layer of the touch sensor panels with localized bridge connections to facilitate interconnections. It is also to be understood that for the purposes of this disclosure, a single layer touch panel can be made of one or more conductive layers with a thin layer of dielectric separating the conductive layers (e.g., with no substrate separating the conductive layers from one another). The dielectric layer separating the different conductive layers of the touch sensor panel can be different than a substrate in that the dielectric layer can be unable to provide mechanical support/integrity to the layers of the touch sensor panel if it were freestanding, without a substrate (which can provide mechanical support/integrity to the layers of the touch sensor panel) upon which the layers of the touch sensor panel described herein can be disposed. Examples of the disclosure are also directed to various touch nodes designs of different shapes, including a square touch node design and multiple rectangular touch node designs. In some examples, the touch sensor panel can be composed of a mix of square touch nodes and various rectangular touch nodes. The disclosed touch node designs of different shapes can improve the touch linearity performance of the touch sensor panels.

Figure 1A:
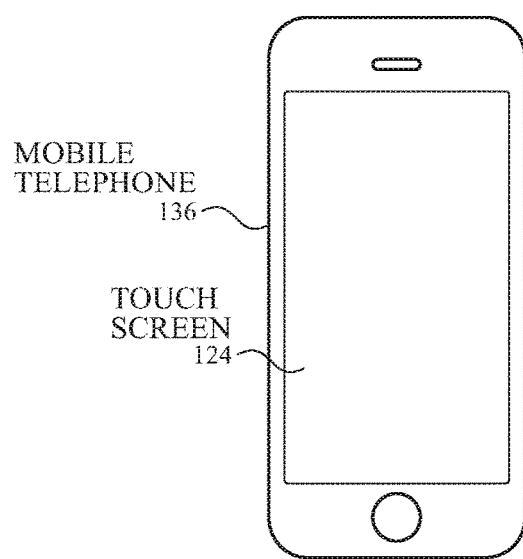
FIGS. 1A-1D illustrate an example mobile telephone, an example media player, an example personal computer and an example tablet computer that can each include an exemplary touch screen according to examples of the disclosure.
Figure 1B:
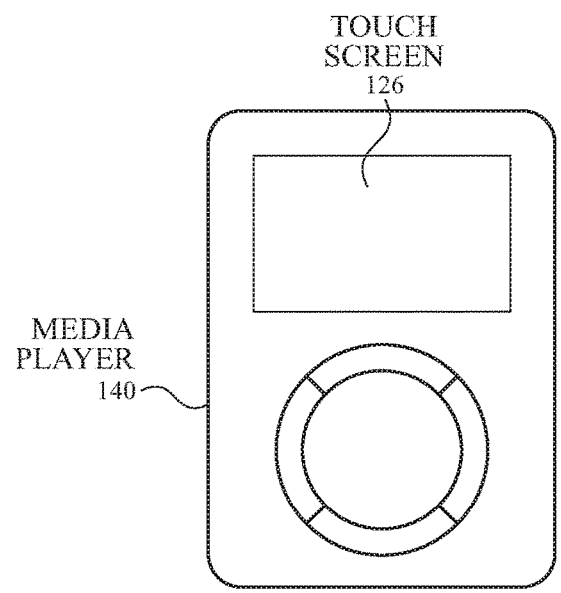
Figure 1C:
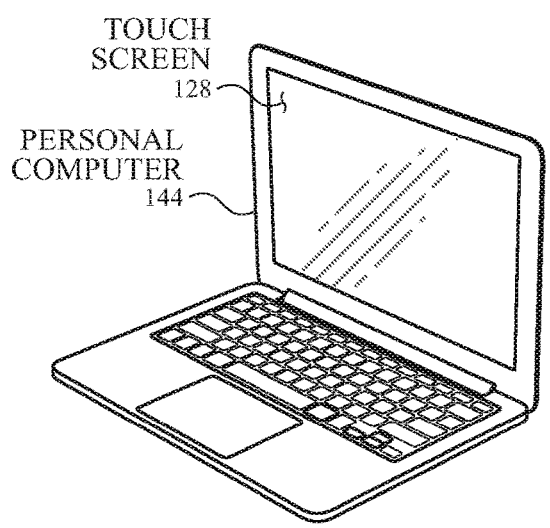
Figure 1D:
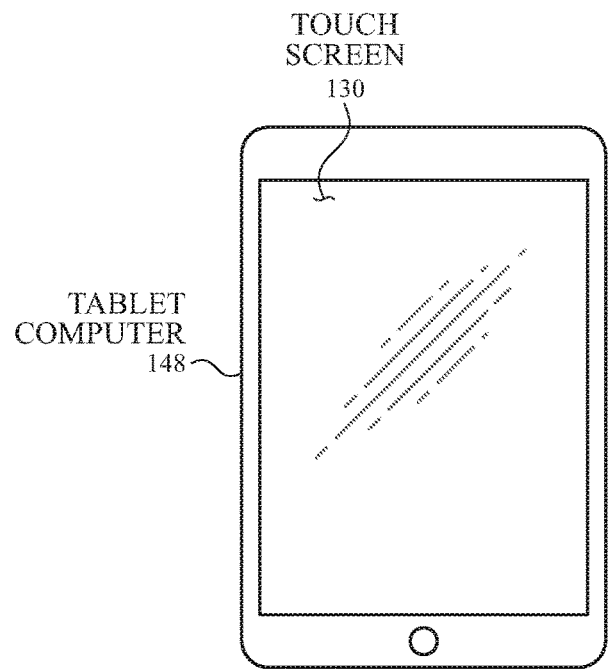

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes or touch sensor electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. In such examples, each touch node electrode can be individually coupled to sense circuitry (circuitry that will be described later) via individual traces. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128 and 130 can be based on mutual capacitance and/or self-capacitance. The electrodes can be arrange as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
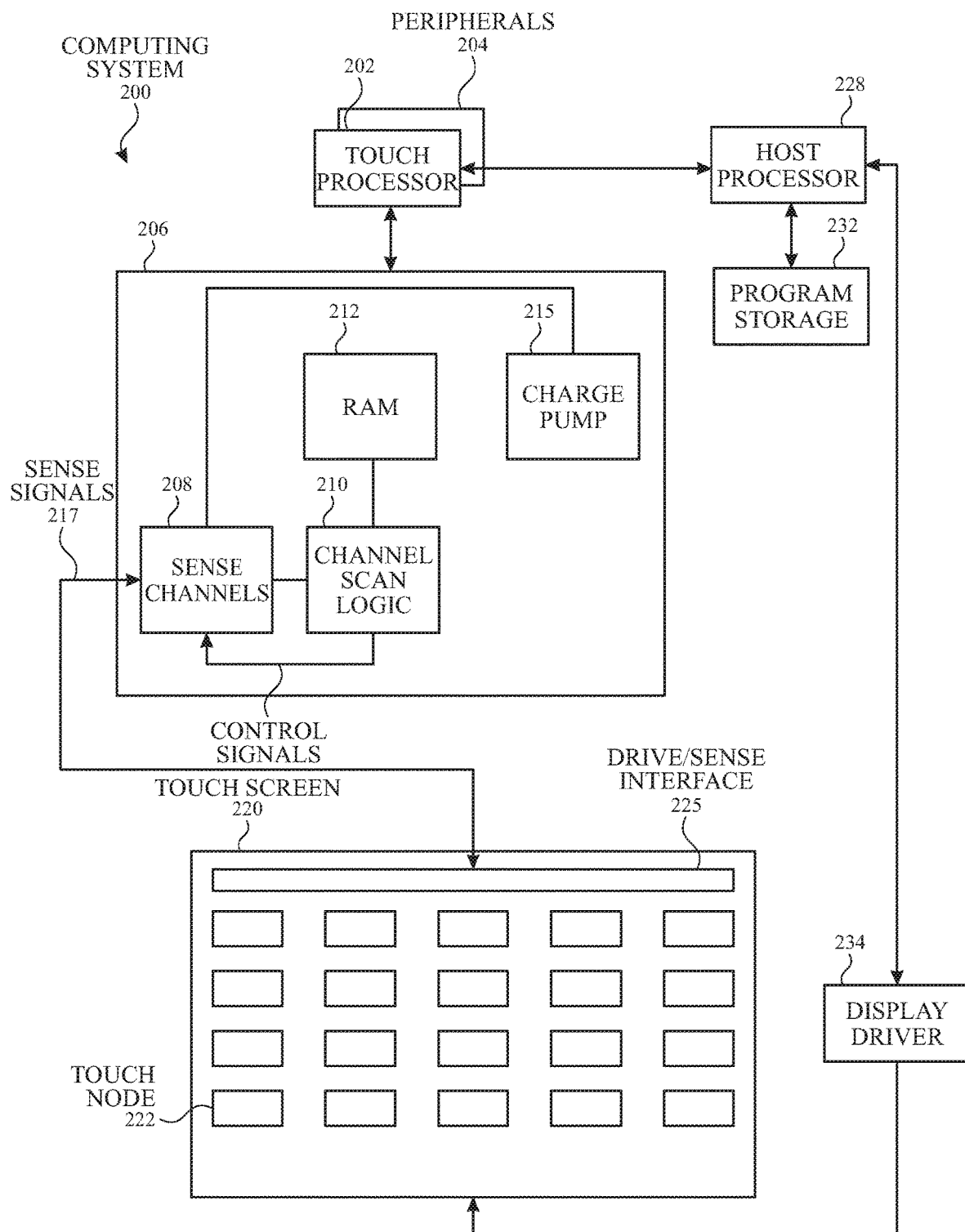
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In some examples, RAM 212 can contain various configuration information for specific touch screen 220 scans performed by channel scan logic 210 (e.g., scan specific configuration information for sense channels 208), can receive and/or store touch data from sense channels 208, and can be managed by channel scan logic 210. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen), and can also include the compensation traces discussed below. Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. In some examples, drive/sense interface 225 can be implemented in the touch controller 206, or can be implemented in a chip separate from touch controller 206. Additional exemplary details of how drive/sense interface 225 can be implemented can be found in U.S. patent application Ser. No. 15/009,774, filed Jan. 28, 2016, entitled "Flexible Self Capacitance and Mutual Capacitance Touch Sensing System Architecture," the entire contents of which is hereby incorporated by reference for all purposes. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as a display driver 234 (e.g., an LCD display driver, an LED display driver, an OLED display driver, etc.). The display driver 234 can provide voltages on select (e.g., gate) lines to each pixel transistor and can provide data signals along data lines to these same transistors to control the pixel display image as described in more detail below. Host processor 228 can use display driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing. It is understood that in some examples, touch screen 220 need not be integrated in a display module or stackup (e.g., need not be in-cell), but can instead be separate from the display module or stackup (e.g., a discrete touch sensor panel that is not part of a display, and is merely overlaid on the display or is separate from the display).

Note that one or more of the functions described herein, including the compensation techniques described herein, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
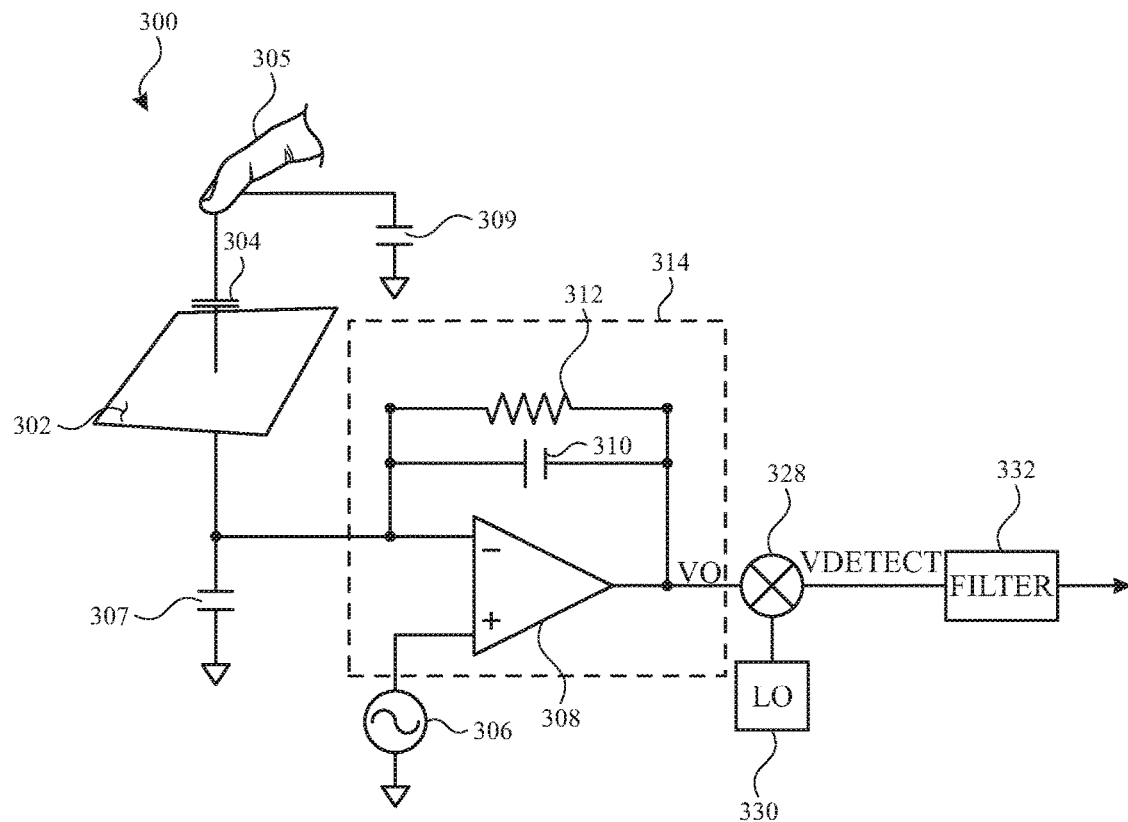
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 (e.g., corresponding to a sense channel of sense channels 208) according to examples of the disclosure. Touch node electrode 302 can correspond to touch node electrode 222. Touch node electrode 302 can have an inherent self-capacitance Cstray 307 to ground associated with it, and also an additional self-capacitance C 304 to ground that is formed when an object, such as finger 305, is in proximity to or touching the electrode. The total self-capacitance to ground of touch node electrode 302 can be illustrated as capacitance C 304+Cstray 307. Finger 305 can have capacitance Cbody 309 to ground. Note that Cbody 309 can typically be much larger than C 304 such that the total series capacitance of C 304 and Cbody 3097 can be approximately C 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. As such, touch sensor circuit 300 can be configured to sense changes in the total self-capacitance 304 of the touch node electrode 302 induced by a finger or object either touching or in proximity to the touch sensor panel. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred; for example, the DC portion of Vdetect can be used by a processor to determine the presence of a proximity or touch event, or the output can be inputted into a discrete logic network to determine the presence of a proximity or touch event. Note that while FIG. 3A indicates the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Figure 3B:
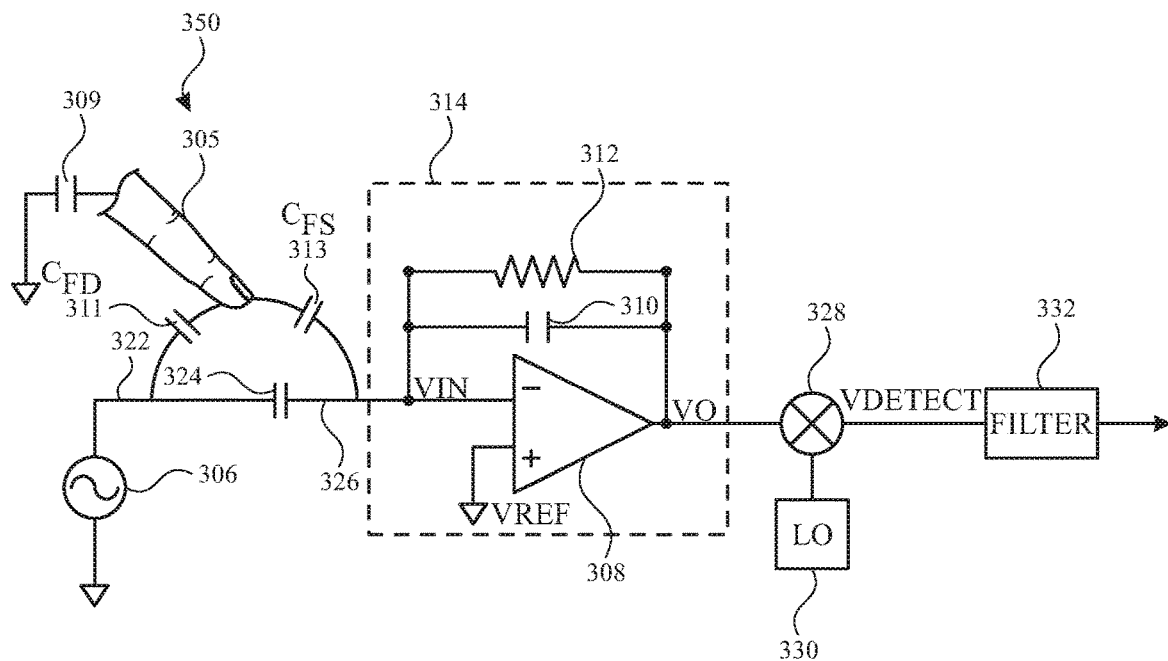
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered as indicated by capacitances $C_{FD}$ 311 and $C_{FS}$ 313, which can be formed between drive line 322, finger 305 and sense line 326. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIG. 3B indicates the demodulation at multiplier 328 occurs in the analog domain, output Vo may be digitized by an ADC, and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can, optionally, be an integrated touch screen in which touch sensing circuit elements of the touch sensing system can be integrated into the display pixel stackups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4A:
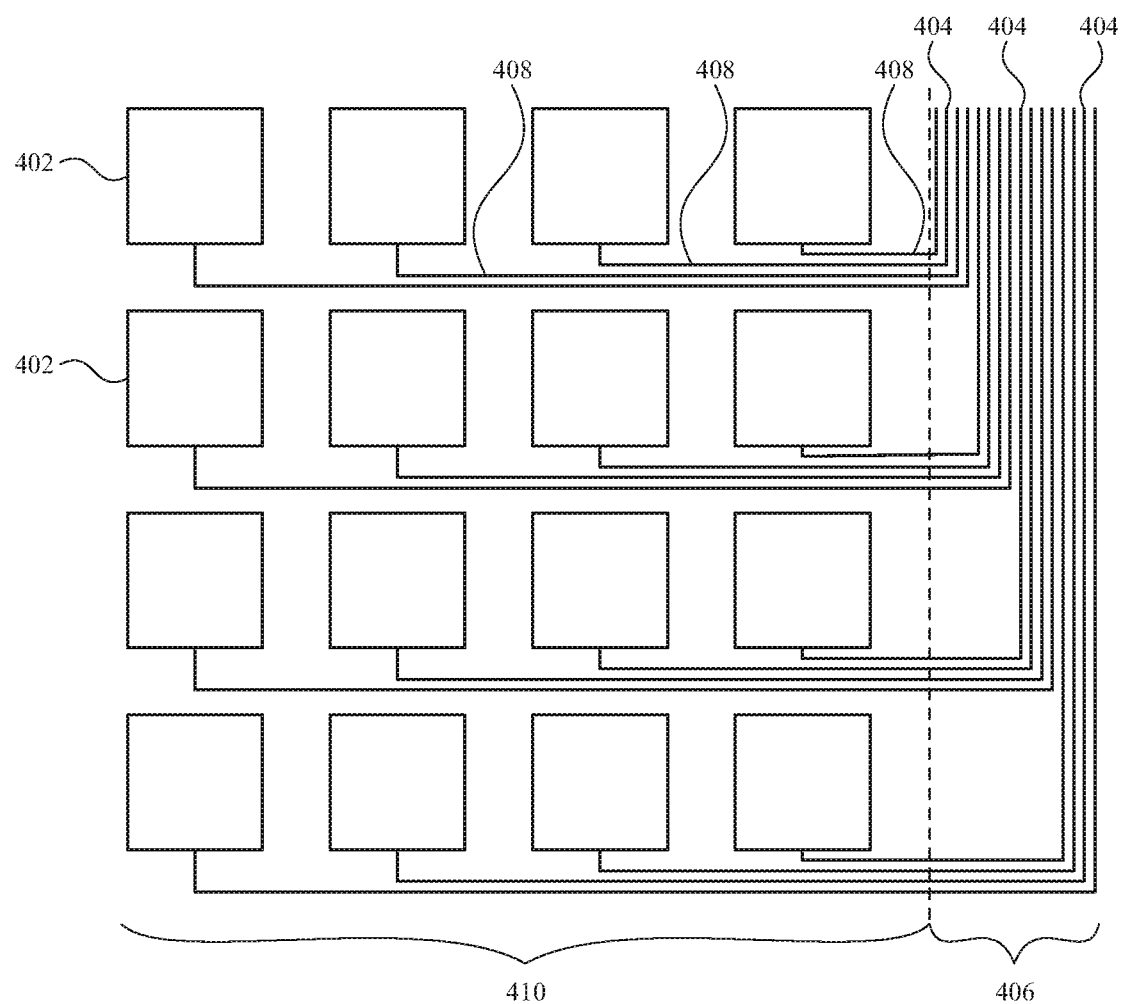
FIGS. 4A-4D illustrate a touch panel and routing traces for touch sensor electrodes of the touch panel according to examples of the disclosure.

FIGS. 4A-4D illustrate a touch panel and routing traces for touch sensor electrodes of the touch panel according to examples of the disclosure. FIG. 4A illustrates a touch sensor panel with touch sensor electrodes 402 (which can correspond to touch node electrodes 222 above) arranged in a four by four matrix that can be used for sensing a touch image as described above with regard to FIG. 2. The touch sensor electrodes can be connected to sensing circuitry (e.g., sensing circuitry illustrated in FIGS. 3A and/or 3B) by routing traces. In some examples, the routing traces can comprise multiple segments, such as edge routing segments 404 and touch region or panel routing segments 408. In some examples, a display region 410 can include touch sensor electrodes 402 and panel routing segments 408 and can correspond to a display area of an electronic device where display pixels can be used to display an image to a user. Accordingly, the touch sensor electrodes 402 and panel routing segments 408 can be made from transparent conductive materials (e.g., ITO, nanowires, carbon nanotubes, etc.) to allow light to pass through. The transparent conductors of the panel routing segments 408 can be used to route signals from the touch sensor electrodes 402 toward an edge region 406 of an electronic device. In some examples, each panel routing segment 408 can be coupled to an edge routing segment 404 that can be comprised of a non-transparent conductor material. In some examples, the non-transparent conductor material of the edge routing segments 404 can have a lower resistance per square than the panel routing segments 408. Accordingly, the edge region 406 can be utilized for routing signals, via the edge routing segments 404, to sensing circuitry from the touch sensor electrodes 402. In the example of FIG. 4A, edge routing segments 404 are shown being primarily routed vertically and panel routing segments 408 are shown being routed horizontally. In addition, although edge routing segments 404 are illustrated as routing to a top edge in FIG. 4A, other fan-outs of the edge routing segments, such as routing to the top, bottom, left, right, or a combination thereof can be used without departing from the scope of the present disclosure.

Figure 4B:
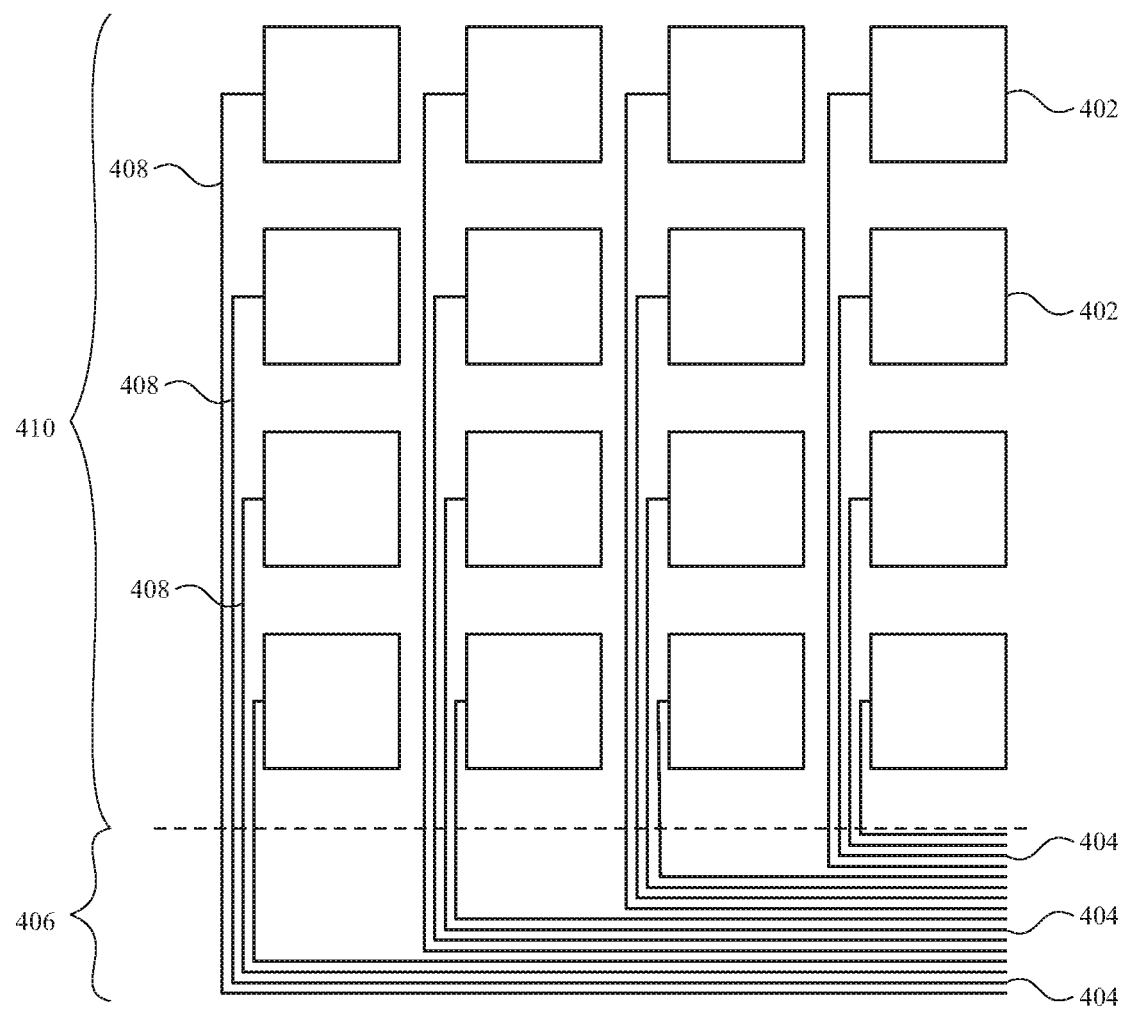

FIG. 4B illustrates that edge routing segments 404 can be routed horizontally and that an edge region 406 can be used for routing below (or above) a display region 410. In some examples, a first subset of the horizontal routing traces can be routed above the display region 410 (not shown in FIG. 4B) and a second subset of the horizontal routing traces can be routed below the display region in two separate edge regions 406. In the exemplary configuration described immediately above, the panel routing segments 408 can be routed vertically to the touch sensor electrodes 402. In the various examples of the disclosure in FIGS. 4C-4D, 5A-5B, and 6, the illustrations show vertical routing of edge routing segments 404 in the edge region 406 and horizontal routing of panel routing segments 408 in the display region 410. It should be understood for each of these examples, the orientation of traces can be rotated as illustrated in FIG. 4B without departing from the scope of the present disclosure.

Touch sensor panels, such as those described above, can be characterized with a bandwidth. The bandwidth can be defined as the range of frequencies over which the touch sensor panel can generate signals without a threshold amount of signal attenuation (e.g., in the resulting capacitance measurements). The performance of the touch sensing system can depend on the amount of attenuation permitted in the system (e.g., 1 dB, 3 dB, 5 dB, etc.). Operating the touch sensing system (e.g., generating a stimulation signal with a fundamental operating frequency) within the bandwidth of the sensor can provide stable performance without attenuation of the signals sensed by the touch sensing system (or with less than a threshold amount of attenuation). However, the bandwidth of touch nodes of the touch sensor panel can be spatially dependent (e.g., due to differences in routing between the touch controller and touch nodes). In some examples, it can be desired to utilize a single fundamental operating frequency for all touch sensor electrodes 402 in a touch sensor panel. As a result, the fundamental operating frequency can be limited by the touch sensor node or nodes that have the lowest overall bandwidth performance. A limiting factor of the bandwidth of a touch sensor panel can be the RC time constants of routing traces used to connect touch sensor electrodes 402 to sensing circuitry. In the present disclosure, signals from touch sensor electrodes 402 can be routed on panel routing segments 408 outside of the display region 410 and further routed on edge routing segments 404 in the edge region to ultimately connect to sensing circuitry. In connecting sensing and touch sensor electrodes 402, it can be beneficial to tune the load (e.g., the resistance and/or the capacitance) that each sense connection presents to the sense channels so that the transient operation of the sense connections can achieve desired parameters (e.g., an RC time constant for each sense connection can be set to a desired value). In some examples, as the total trace length of a routing trace (e.g., comprising an edge routing segment 404 and a panel routing segment 408) increases, the width of the routing trace (e.g., the width of each of the segments) can correspondingly be increased to reduce resistance of the trace and increase bandwidth to match shorter routing connections.

Figure 4C:
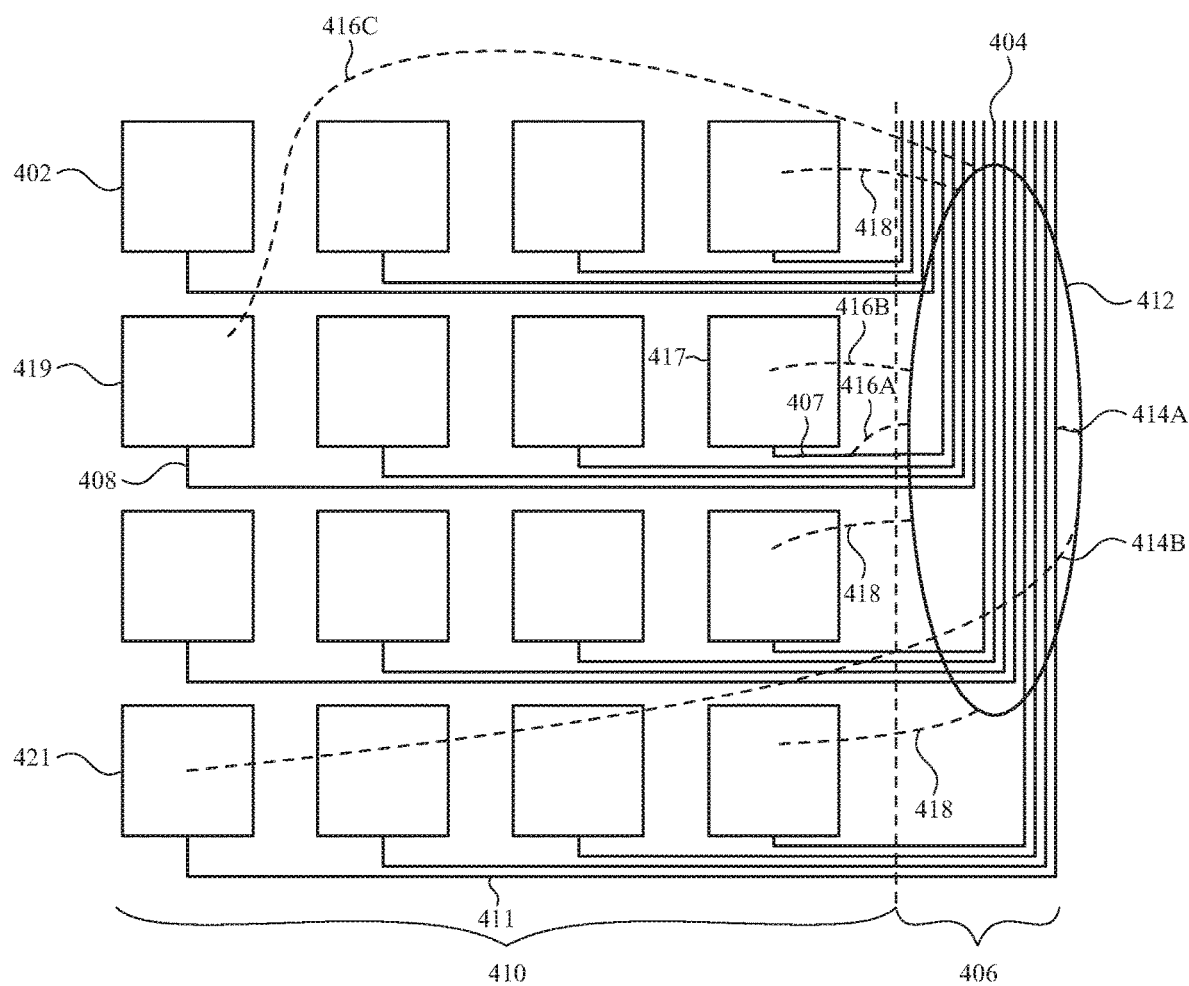

FIG. 4C illustrates exemplary coupling between a user's grip 412 and touch sensor electrodes 402, panel routing segments 408, and edge routing segments 404 according to examples of the disclosure. In some examples, the user's grip 412 can couple to touch sensor electrodes 402 near the edge region 406 of the touch sensor panel as indicated by the dashed lines 418 and 416B. In some examples, the signals from the user's grip 412 measured at these electrodes can be considered a portion of the touch image provided by the touch sensor panel that depicts the position of the user's hands and fingers. In some examples, coupling between the user's grip 412 and touch sensor electrodes 402 can decrease as the distance between the user's grip and the touch sensor electrode increases. In addition to the coupling between the user's grip 412 and the touch sensor electrodes 402, FIG. 4C further illustrates coupling between the user's grip and panel routing segments 408 used to connect the touch sensor electrodes to the edge routing segments 404. For example, dashed line 416A illustrates a coupling between the user's grip 412 and a panel routing segment 407 corresponding to the touch sensor electrode 417 that can also be coupled to the user's grip as indicated by dashed segment 416B. The user's grip 412 can also couple to each of the other panel routing segments 408 proximate to the user's grip. For example, the user's grip 412 can couple to the panel routing segment 408 that is connected the left-most touch sensor electrode 419 in the same row as touch sensor electrode 417 as indicated by dashed segment 416C. Although capacitive coupling between the user's grip 412 and the touch sensor electrode 419 may be low due to a relatively large distance between the user's grip and touch sensor electrode 419, touch sensor circuitry that is used to sense touch sensor electrode 419 can also receive a signal resulting from the coupling between the user's grip and the panel routing segment 408. Furthermore, for longer traces such as panel routing segment 408 connected to touch sensor electrode 419, the width of the segment 408 may be increased (e.g., relative to the shorter segment 407) to reduce trace resistance, thereby increasing bandwidth to match with shorter traces. In some examples, an amount of coupling between the user's grip 412 and a particular panel routing segment 408 can be proportional to the area of the particular panel routing segment. By comparison, the relatively shorter panel routing segment 407 may be able to achieve a desired bandwidth with a relatively narrower trace width due to its shorter length in relation to the routing segment 408 connected to touch sensor electrode 419, for example. Therefore, as a result of widening the panel routing segment 408 to increase bandwidth, the area of segment 408 can also increase, which can subsequently increase the amount of coupling to the user's grip. In some examples, the panel routing segments 408 can be gradually widened as the length of each trace increases to balance the overall bandwidth of the touch sensor electrodes 402. Therefore, in some examples, coupling between the user's grip 412 and panel routing segments 408 as measured by touch sensor circuitry can increase as the distance between the user's grip 412 and the touch sensor electrode 402 connected to a particular panel routing segment 408 increases. In some examples, to the extent that the panel routing segments 408 have a repeated connection pattern for each row, the effect of a user's grip 412 coupling to each row can display a systematic effect that is regular across the panel. In conjunction with the touch sensing signals detected by the touch sensor electrodes 402 indicated by dashed lines 418 and 416B, this systematic crosstalk effect can be removed based on the grip signal measured at the touch sensor electrodes.

As illustrated in FIG. 4C, the user's grip 412 can also couple to edge region routing segments 404. For example, the edge region routing segment 411 that is used to route the signal from touch sensor electrode 421 can be coupled to the user's grip as illustrated by the dashed line 414A. Similar to the touch sensor electrode 419 discussed above, coupling between the user's grip 412 and the touch sensor electrode 421 itself, illustrated by dashed line 414B, can be relatively small due to the large distance between the user's grip and the touch sensor electrode 421. However, touch sensor circuitry that is used to sense touch sensor electrode 421 can also receive a signal resulting from the coupling between the user's grip and the panel routing segment 411, which can result in an erroneously large touch signal attributed to the touch sensor electrode 421. As will be discussed in more detail below with regard to FIGS. 5A-5B, this routing to edge region routing segments 404 can be compensated using reference electrodes.

Figure 4D:
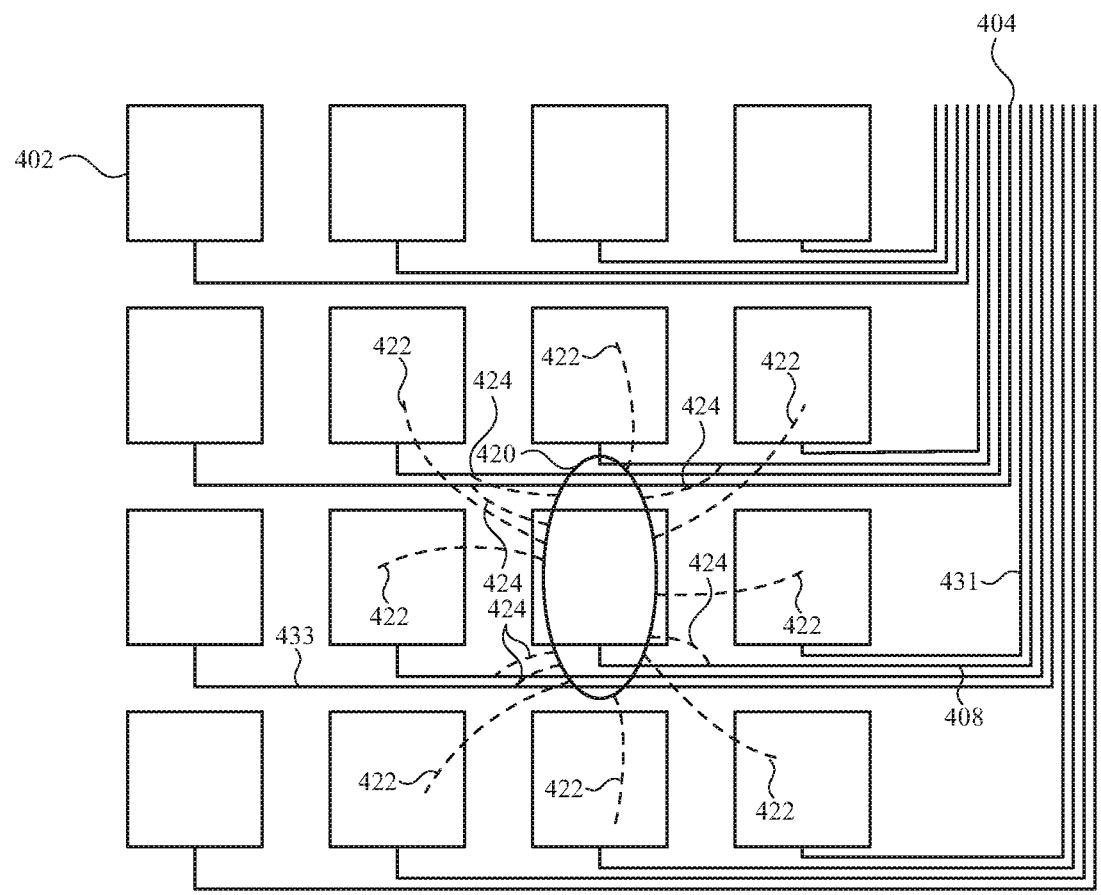

FIG. 4D illustrates exemplary coupling between a finger 420, touch sensor electrodes 402, and panel routing segments 408 according to examples of the disclosure. As illustrated in FIG. 4D, the finger 420 can couple to touch sensor electrodes 402 that are proximate to the location of the finger above the touch sensor panel. The coupling to the finger can be strongest with the touch sensor electrode 402 positioned directly underneath the finger in the illustration. In the illustrated example, the finger is illustrated as directly overlapping a single touch sensor electrode 402, and coupling between the finger and adjacent proximate touch sensor electrodes 402 is illustrated by the dashed lines 422. As explained above, the readings from each of the touch sensor electrodes 402 can be used to form an image of touch by the finger 420. In addition to coupling between the finger 420 and the touch sensor electrodes 402, dashed lines 424 illustrate coupling between the finger and panel routing segments 408 in the vicinity of the finger. As shown in FIG. 4D, the routing trace 431, which connects to a touch sensor electrode 402 to the right of the location of finger 420 ends and does not pass directly under the finger 420. Thus, in the illustrated configuration where routing connections are made from right to left, the output signals for touch sensor electrodes 402 to the right of a touch location will experience little or no signal contribution due to coupling between the finger 420 and panel routing segment 431. In some examples, the touch sensor electrode 402 connected to panel routing segment 431 can be considered "upstream" of the finger location, and thus little or no finger crosstalk can be expected. On the other hand, the finger 420 in FIG. 4D is illustrated as directly overlapping the panel routing segment 433 that connects to a touch sensor electrode 402 on the left-hand side of the touch sensor panel. This electrode can be considered "downstream" of the touch sensor electrode at the finger location because finger crosstalk with the routing trace can be expected. FIGS. 7-12 below describe various techniques for compensating the finger crosstalk effects described with regard to FIG. 4D.

In the example of FIGS. 4A-4D, a four by four matrix of touch sensor 402 electrodes is shown to provide an example of relevant features of a touch sensor panel according to the examples of the disclosure. It should be understood that different numbers of touch sensor electrodes can be used without departing from the scope of the present disclosure. Furthermore, it should be understood that although the example includes a square pattern of touch sensor electrodes 402, touch sensor electrode layouts in different shapes (e.g., rectangular, circular, etc.) can be used without departing from the scope of the present disclosure. Although edge routing segments 404 are illustrated as routing vertically to a top edge in FIGS. 4A, 4C, and 4D and routing horizontally to a right edge in FIG. 4B, other fan-outs of the edge routing segments 404, such as routing vertically and/or horizontally to the top, bottom, left, and/or right, and any combination thereof can be used without departing from the scope of the present disclosure. However, as will be understood further from the discussion below of FIGS. 5-12, different physical topologies may require modifications to the positioning of compensation traces and/or may result in different relationships between touch sensor electrodes captured in crosstalk correction matrices. Such modifications should be understood to remain within the scope of the present disclosure.

Figure 5A:
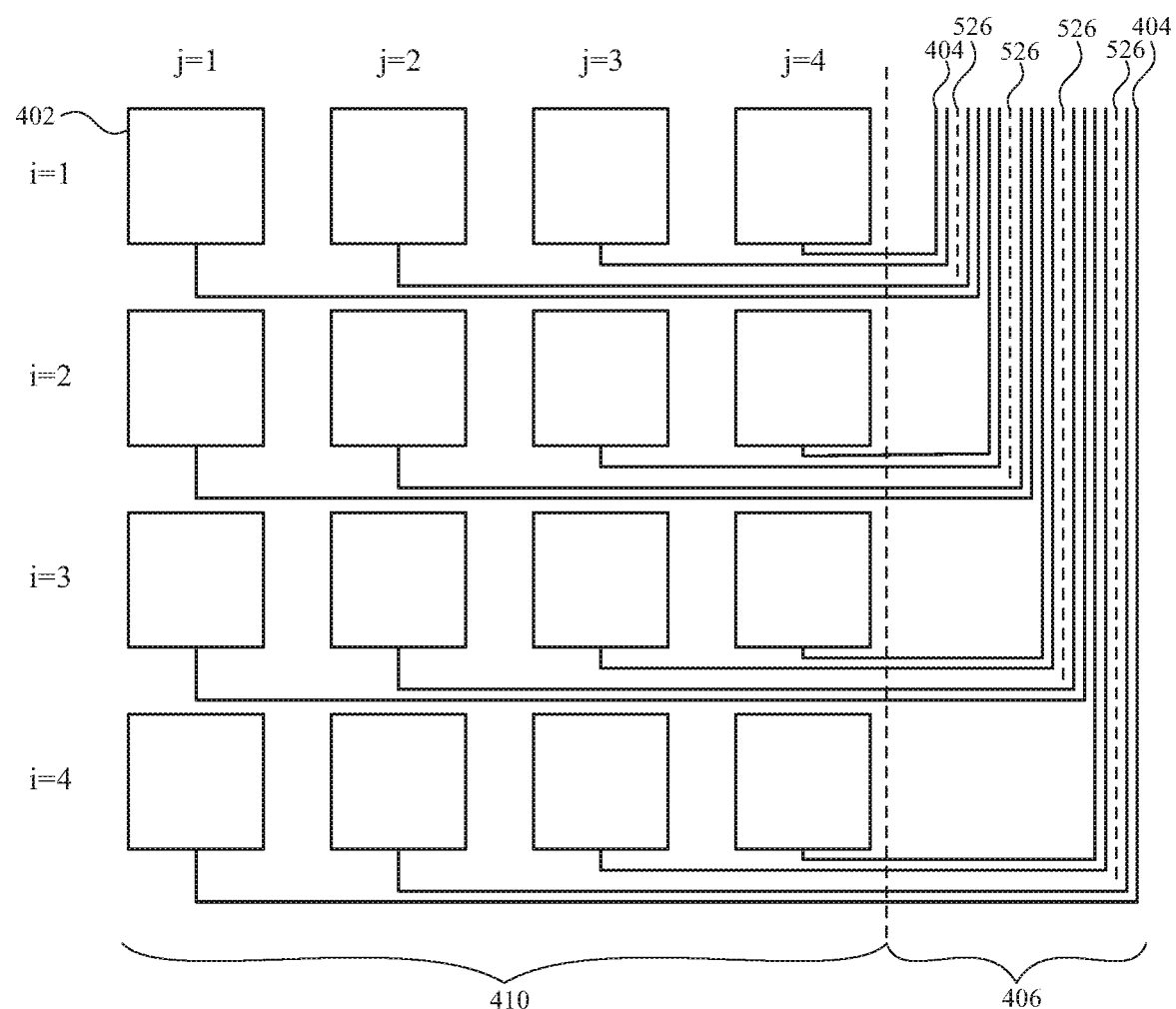
FIGS. 5A-5C illustrate a touch panel and routing traces with compensation traces according to examples of the disclosure.
Figure 5B:
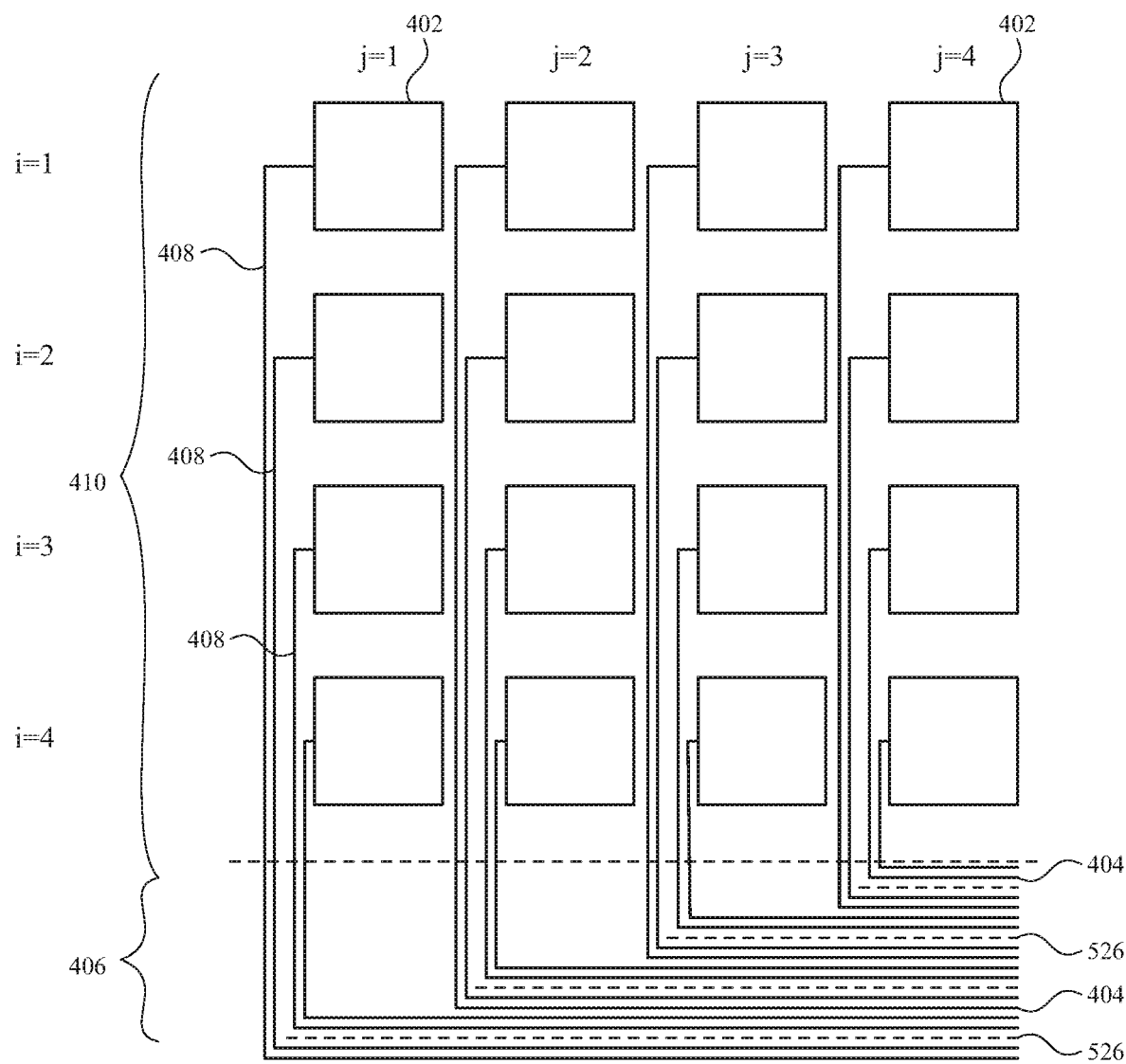
Figure 5C:
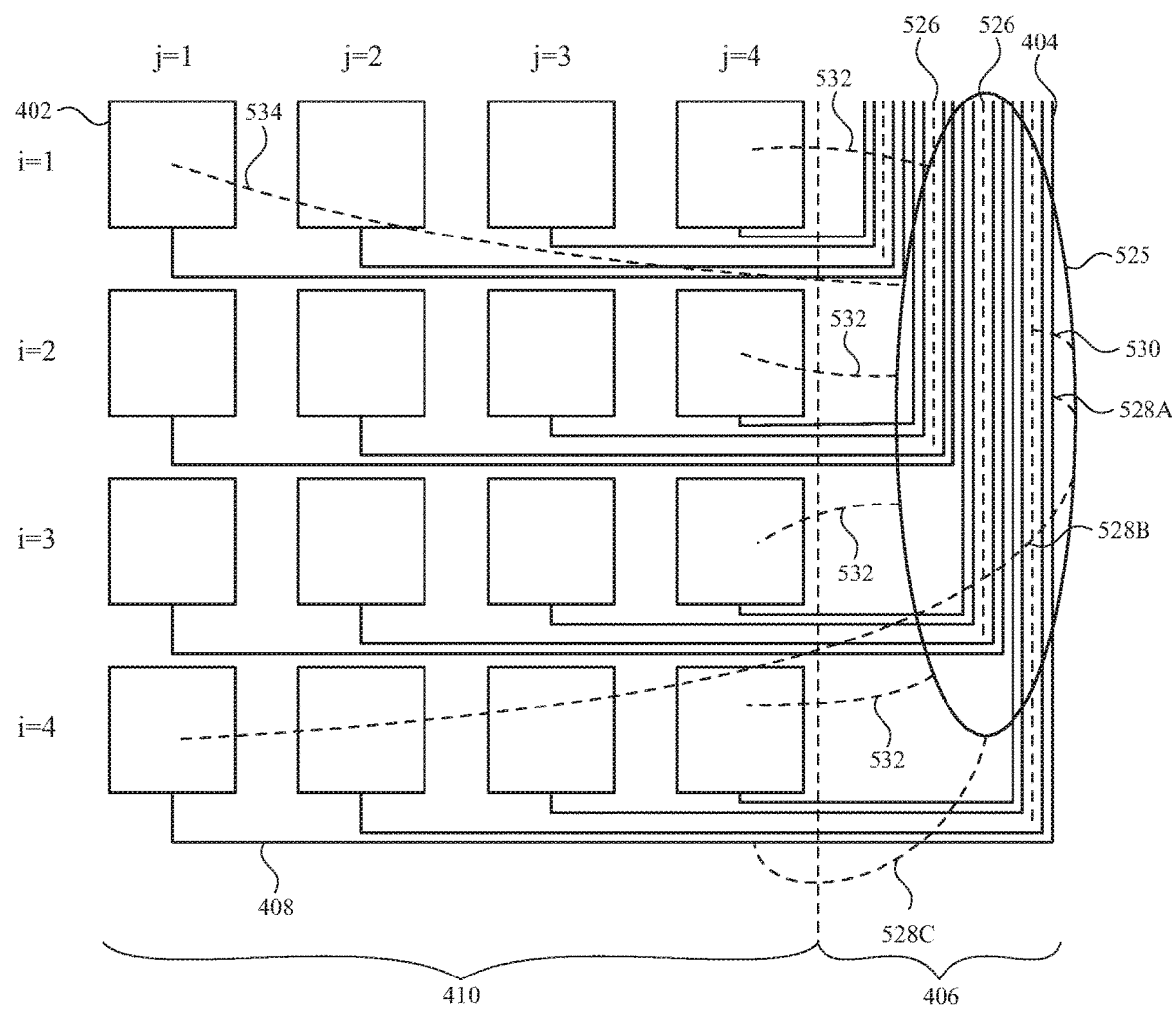

FIGS. 5A-5C illustrate a touch panel and routing traces with compensation traces according to examples of the disclosure. In FIGS. 5A-5C, the rows and columns are labeled with indices i for rows and j for columns. As illustrated in FIG. 5A, in some examples, compensation traces 526 can be routed in the edge region 406 of the panel, where the compensation traces are not coupled to touch sensor electrodes 402 and thus are configured to only measure a component of grip signal (e.g., as shown in FIG. 4C above). In some examples, compensation traces 526 can be made of a non-transparent conductive material (e.g., copper) where the compensation traces can be shielded by an opaque mask. In the illustrated configuration of FIG. 5A, a compensation trace 526 is provided for each routing channel of the touch sensor panel. In particular, for each row i, one compensation trace 526 can be provided proximate to and interspersed with edge routing segments 404 also associated with the particular row i. Similarly, FIG. 5B illustrates a rotated configuration where routing of the panel routing segments 408 is done through column routing channels, and thus for each column j, one compensation trace 526 can be provided proximate to and interspersed with edge routing segments 404 also associated with the particular column j.

FIG. 5C illustrates an exemplary user grip 525 (e.g., from a user's palm while holding a mobile phone, tablet, or the like) positioned near the edge region 406 of the touch sensor. Similar to the previous discussion for FIGS. 4C and 4D, dashed lines 528A, 528B, 528C, 530, and 532 can represent coupling between the user grip 525 and different elements of the touch panel. Dashed line 528A can represent a coupling between the grip 525 and the right-most edge routing segment 404. The dashed line 528B illustrates a coupling between the grip 525 and the corresponding touch sensor electrode 402 corresponding to the right-most edge routing segment 404. Dashed line 528C can represent a coupling between the grip 525 and the panel routing segment 408 corresponding to the right-most edge routing segment 404. As explained above, the touch sensor electrode 402, the right-most edge routing segment 404, and the panel routing segment 408 connecting the two can produce a single signal for readout at touch sensor circuitry (e.g., as illustrated in FIGS. 3A-3B). Accordingly, the coupling between the user's grip 525 and right-most edge routing segment 404 indicated by dashed line 528A, and in some instances the coupling between the user's grip 525 and panel routing segment 408 corresponding to the right-most edge routing segment 404 indicated by dashed line 528C, can produce a signal at the touch sensor circuitry even when there is very little coupling between the user's grip and the touch sensor electrode 402 (indicated by dashed line 528B) over the relatively large distance between the user's grip and the touch sensor electrode.

In some examples, the compensation traces 526 can be provided interspersed with the edge routing segments 404. In the illustrated example, a single compensation trace 526 is provided for each row i of the matrix of touch sensor electrodes 402. In some examples, the compensation trace 526 can be routed such that the length of the compensation trace is approximately half way between the shortest routing trace for the row and the longest trace for the row as illustrated in FIG. 5C. In some examples, the compensation trace 526 can be positioned with an equal number of routing traces for the corresponding row on either side of the compensation trace. In some examples, the compensation trace 526 can be positioned between routing channels for different rows i, and the compensation trace can have a length similar to the length of the longest edge routing segment 404 for the same row i. In some examples, the spacing between adjacent edge routing segment 404 and the compensation trace 526 can be made equal such that the spacing between each adjacent trace in the edge region 406 is equal regardless of whether the trace is an edge routing segment 404 or a compensation trace 526.

In some examples, due to the close proximity of the compensation trace 526 to the edge routing segments 404 of each row, the overlap between the user's grip 525 and the compensation trace can be similar to the overlap between the user's grip and the edge routing segments 404 of the row corresponding to a particular compensation trace. For example, as illustrated in FIG. 5C, the right-most compensation trace 526 (e.g., associated with row i=4) experiences a coupling with the user's grip 525 illustrated by the dashed line 530 that can correspond to the coupling 528A between the user's grip and the right-most edge routing segment 404. Accordingly, the signal resulting from coupling between the compensation traces 526 and the user's grip 525 can be used to reconstruct the coupling between the user's grip and the edge routing segments 404. In some examples, the reconstruction of the coupling between the user's grip and the edge routing segments 404 can be performed on a row-by row basis. In other words, the compensation trace 526 for row i=1 can be used for compensating coupling of the user's grip 525 to edge routing segments 404 associated with row i=1. Similarly, compensation traces for other rows i can be used to compensate coupling of the user's grip 525 to the edge routing segments associated with the corresponding row i more generally. In some examples, the signal coupling between the user's grip 525 and each compensation trace 526 can depend upon an area of the compensation trace. Similarly, the coupling signal between the user's grip 525 and each of the edge routing segments 404 can depend upon the area of each of the edge routing traces. Accordingly, the signal measured by the compensation traces 526 can be scaled by a ratio between the area of the compensation trace (e.g., for row i=1) and the area of the corresponding edge routing segments 404 for the row being compensated (e.g., row i=1). As explained above, the width of routing traces that are relatively long (e.g., connecting to touch sensor electrodes 402 in the far left column j=1 in FIG. 5C) can be increased to reduce resistance and improve bandwidth. As a result, a scaling factor for long traces can be larger than a scaling factor for shorter traces due to differences in area resulting from the differences in width. In some examples, the compensation amount for each of the edge routing segments 404 as determined from measurement of the compensation traces 526 can be explained by the following equation.

$$C_{trace}(i,j) = C_{comp}(i) * \text{Area}_{trace}(i,j)/\text{Area}_{comp}(i) \quad (1)$$

where $C_{trace}(i,j)$ is the compensation factor for an edge routing segment 404 corresponding a touch sensor electrode in row i, column j. On the right hand side of the equation (1), $C_{comp}(i)$ can represent a measurement of the coupling between the user's grip 525 and the compensation trace 526 associated with the routing channel for row i, and $\text{Area}_{trace}(i,j)/\text{Area}_{comp}(i)$ can represent a ratio of the area between the edge routing segment corresponding to the touch sensor in row i, column j and the area of the corresponding compensation trace 526 for row i. A similar equation can describe the compensation factor for an edge routing trace for routing traces in a vertical direction as shown in FIG. 5B, which can be described by the corresponding equation:

$$C_{trace}(i,j) = C_{comp}(j) * \text{Area}_{trace}(i,j)/\text{Area}_{comp}(j) \quad (2)$$

where a compensation trace 526 can be provided for each column j instead of each row i, and can function in an analogous way. In some examples, once the area scaling factor is applied to the measured signal at the compensation trace 526, the scaled signal $C_{trace}(i,j)$ can be subtracted from the measurement for each corresponding touch sensor electrode 402, thereby compensating the grip 525 to edge routing segment 404 coupling from the touch image. Although the examples above describe using one compensation trace 526 per row i or per column j, it should be understood that configurations where more than one compensation trace per row i or per column j can be used without departing from the scope of the present disclosure. Similarly, in some examples, fewer compensation traces 526 can be used, such as every other row, every third row, or the like without departing from the scope of the present disclosure. It should be noted that in the case of using fewer compensation traces 526, care should be taken to ensure that coupling from a user's grip into the a particular compensation trace 526 that is used for compensation of a particular segment or trace is representative of the coupling from a user's grip to the particular segment or trace that is being compensated. Compensation through the use of compensation traces and/or computations, as described above and throughout, can be performed in some examples by circuitry such as the touch controller 206 and/or touch processor 202 of FIG. 2. In some examples, the edge routing segments 404 and compensation traces 526 can be coupled to sensing circuitry such as sense channels 208 in FIG. 2. Touch sensor outputs from sensing circuitry coupled to edge routing segments 404, and compensation outputs from sensing circuitry coupled to compensation traces 526 can be received by touch processor 202, where compensation of the touch sensor outputs based on the compensation outputs can be performed (e.g., subtracting the compensation output from the corresponding touch sensor outputs). In other examples, the sensing circuitry outputs can be received and compensated by a processor and/or discrete logic within the touch controller 206. In still other examples, compensation can be performed by analog circuitry, such as a differential amplifier (or other subtraction circuitry) to perform compensation by subtracting in the analog domain.

Figure 6:
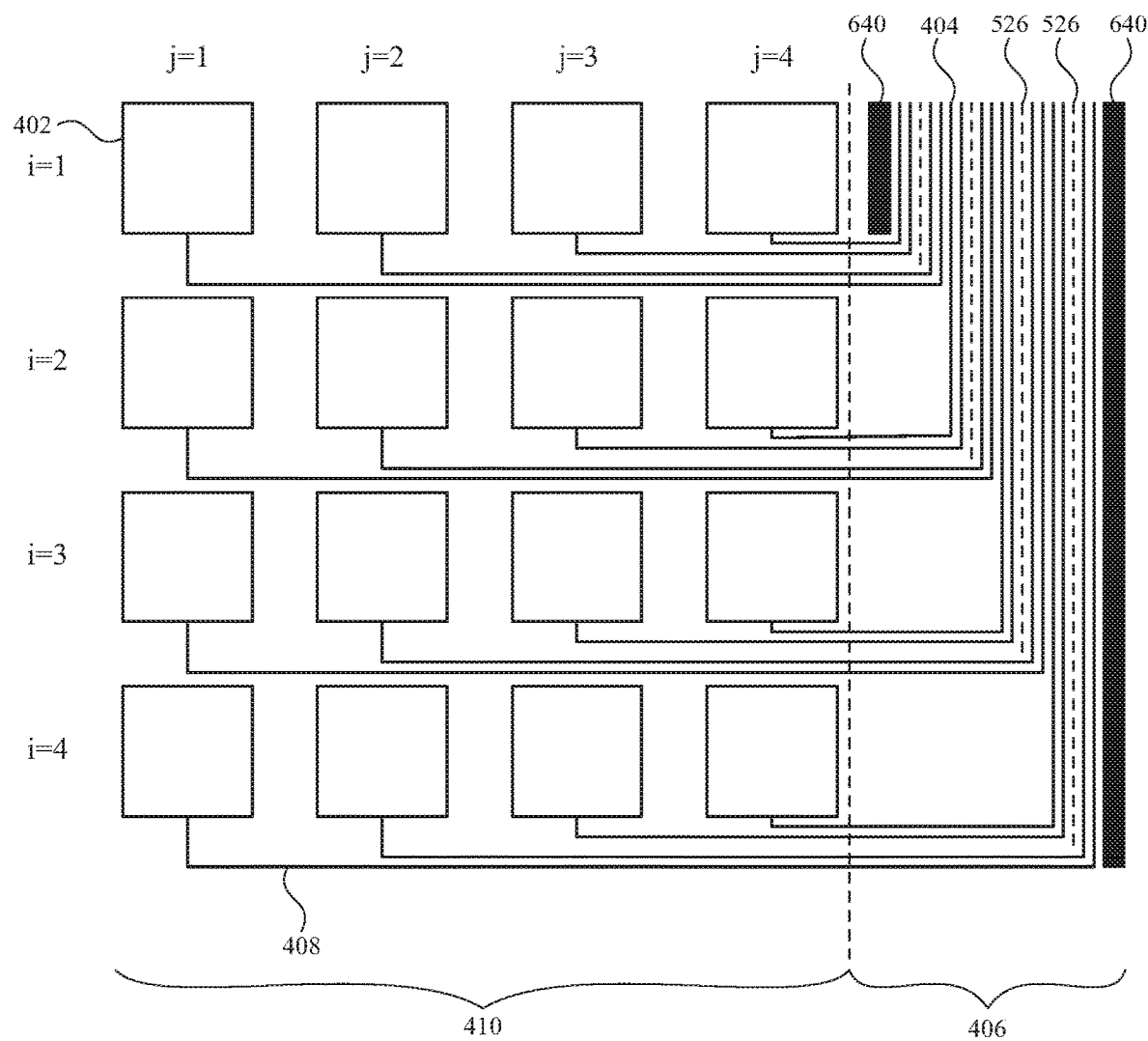
FIG. 6 illustrates a touch panel and routing traces with compensation traces shielding electrodes according to examples of the disclosure.

FIG. 6 illustrates a touch panel and routing traces with compensation traces and shielding electrodes (conductors) according to examples of the disclosure. As illustrated in FIG. 6, shield electrodes 604 can be added proximate to outer-most traces of the edge routing segments 404. As shown previously in FIGS. 5A-5B, in the absence of the shield electrodes 640, the right-most edge routing segment 404 has no trace to its right and similarly the left-most edge routing trace has trace to its left. In the edge routing segments 404 that have a neighboring trace on either side, in some instances the fringing fields for each trace can terminate in a nearby trace, which can limit the coupling with the user's grip (e.g., 525 in FIG. 5B above). On the other hand, the traces that only have an adjacent trace on one side can experience greater coupling to a user's hand (e.g., 525 in FIG. 5B above) due to the increased fringing fields on the side with no adjacent trace. In some examples, shield electrodes 640 can be positioned near left-most and right-most edge routing segments 404 and can be used to terminate the fringing fields of the outer-most traces and reduce coupling with the user's grip similar or equivalent to the other edge routing traces that have an adjacent trace on each side. In some examples, the shield electrodes 640 can be included on the same metal layer as the edge routing segments 404. In some examples, the shield electrodes 604 can all be grounded. In some examples, some of the shield electrodes 640 can be grounded and others of the shield electrodes 640 can be floating. For example, the shield electrodes 640 on the left side of the routing traces may not be easily capable of connection to ground and thus can be left floating. Both floating and grounded shield electrodes 640 can achieve the effect of terminating fringing field lines from the outer-most routing traces to reduce coupling to the user's grip. In some examples, as illustrated, the topology of the edge routing segments 404 can require non-continuous metal segments making up the shield electrodes 640. In some examples, the shield electrodes 640 can be patterned to match steps, jogs, and discontinuities in the pattern of the edge routing electrodes 404 to provide shielding to the routing traces as illustrated in the FIG. 6.

Figure 7A:
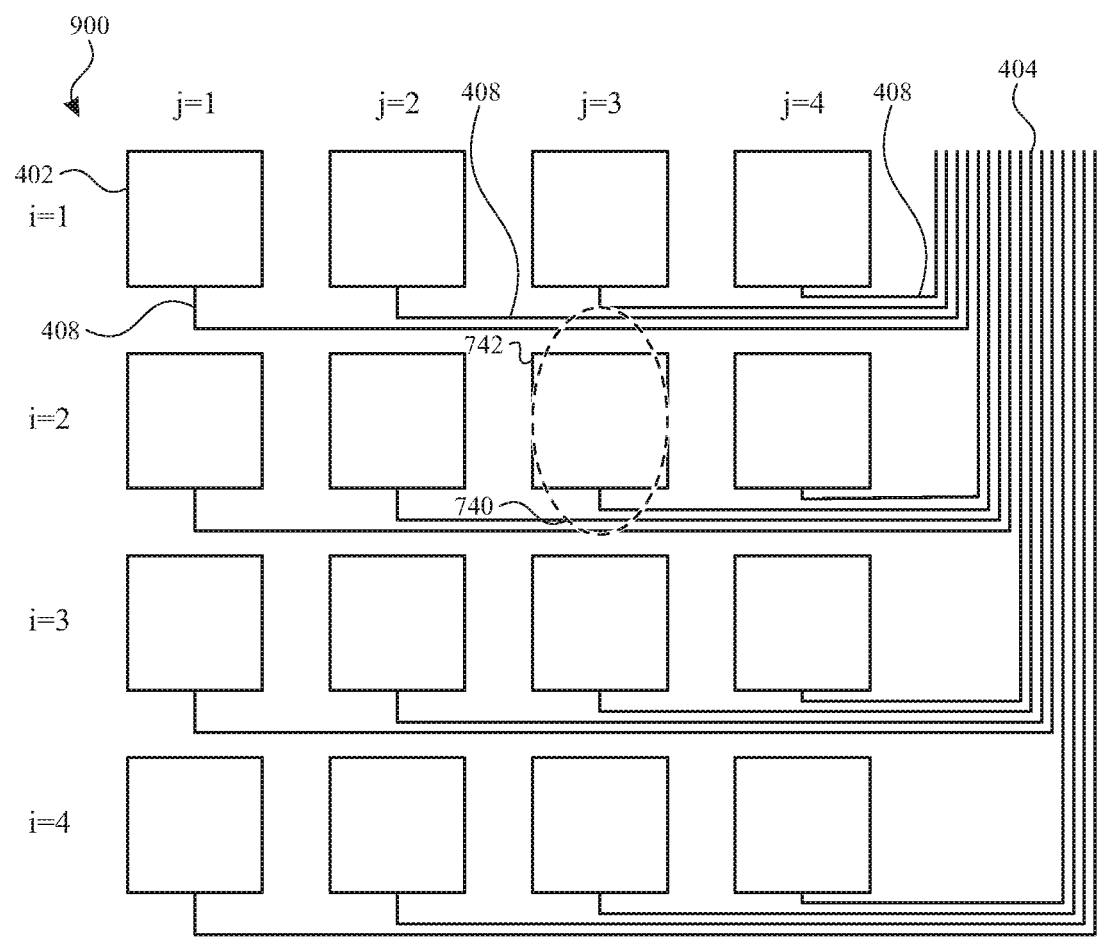
FIGS. 7A-7C illustrate exemplary crosstalk relationships between touch panel electrodes t according to examples of the disclosure.
Figure 7B:
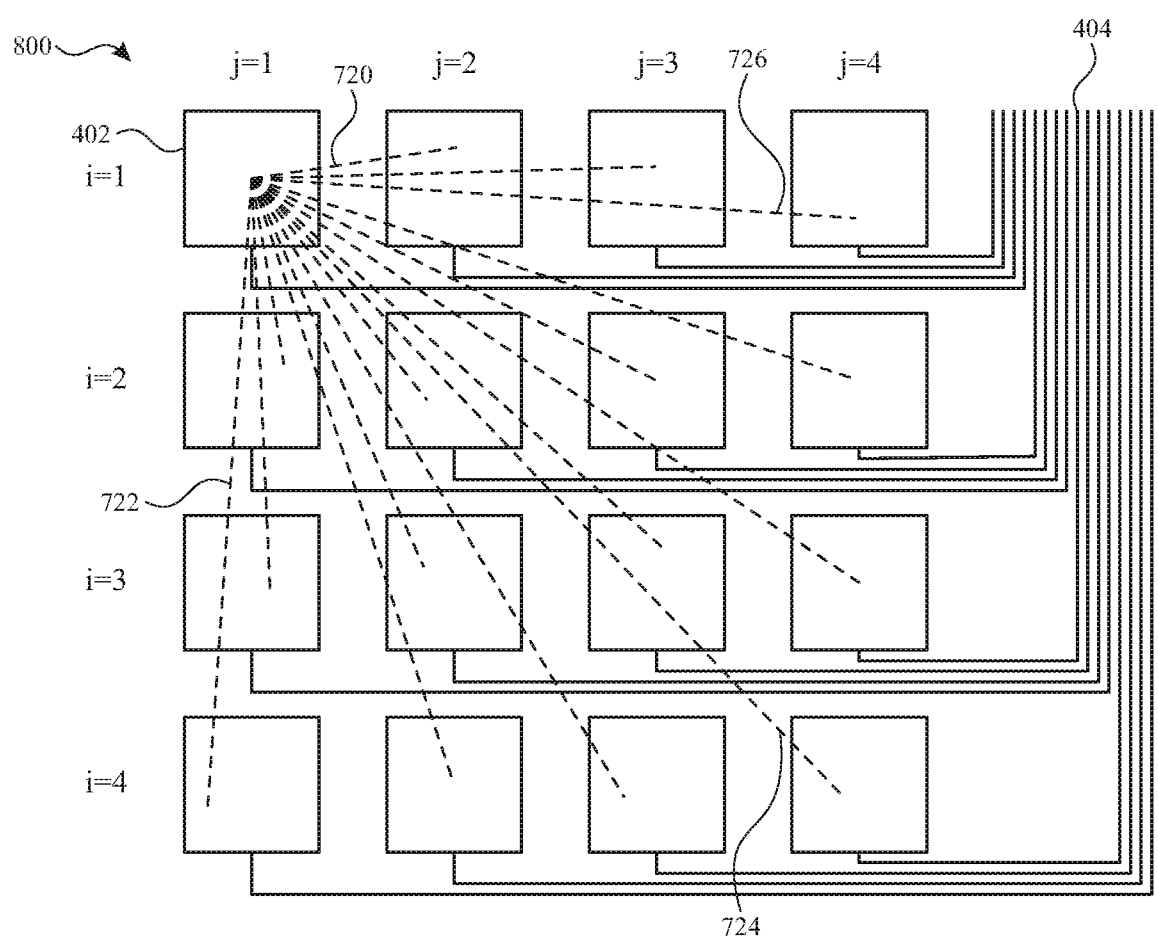
Figure 7C:
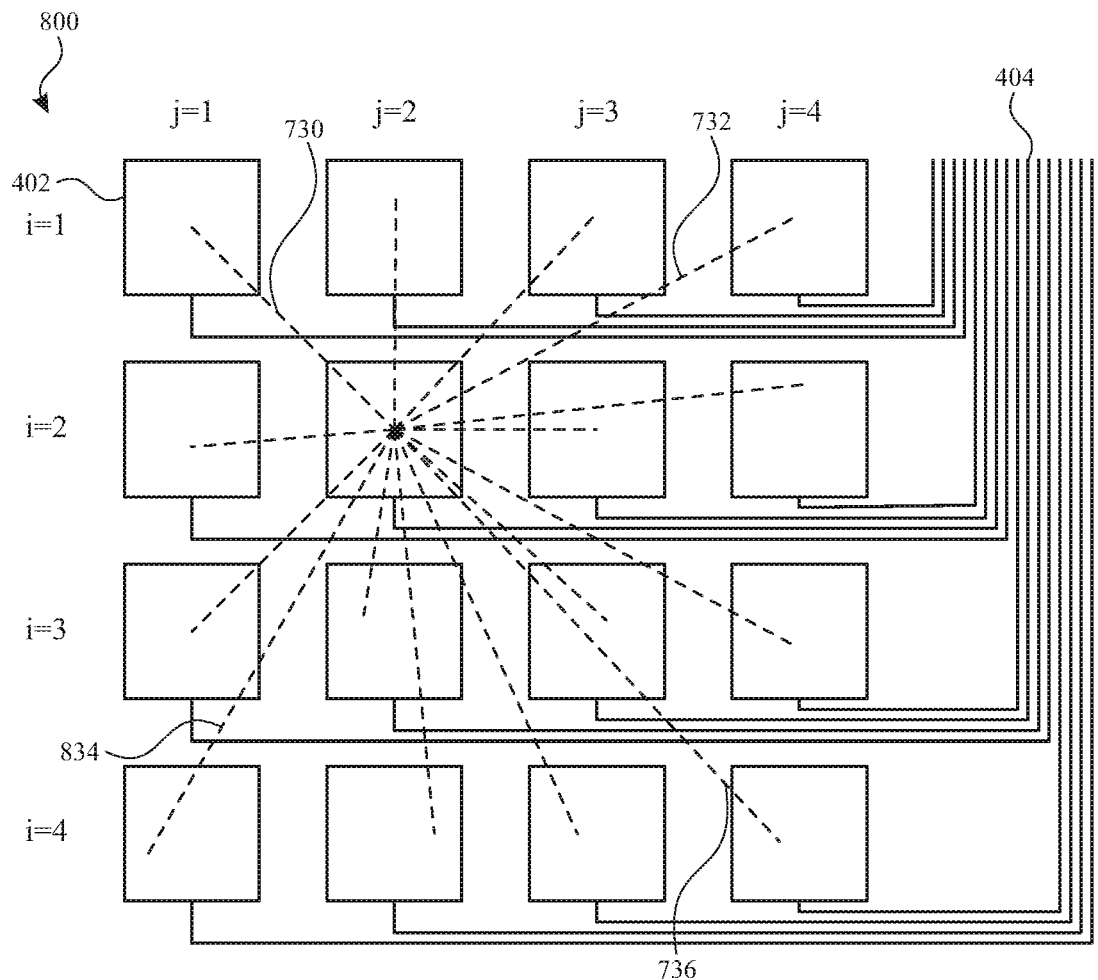

FIGS. 7A-7C illustrate exemplary crosstalk relationships between touch panel electrodes according to examples of the disclosure. FIG. 7A illustrates a touch location of a finger contact 740 proximate to a particular touch sensor electrode 742 (e.g., at row 2, column 3). As can be seen from the illustration, the finger contact 740 can overlap with, and thus couple capacitively to, routing traces for other electrodes 402 in the touch sensor panel. For example, the illustrated finger contact overlaps with routing traces 408 for row 2, columns 1-3, and row 1, columns 1-3. Accordingly, even though there is no finger contact near the touch electrode in row 1, column 1, sensor circuitry coupled to the touch electrode at row 1, column 1, may detect the coupling between the finger contact 740 and the display area routing segment 408 coupled to the touch electrode at row 1, column 1 and the resulting coupling may alter a determined touch location of the finger contact as a result. This type of coupling between an object (e.g., finger contact 740) and the display area routing traces 408 can be referred to as finger crosstalk herein. As should be suggested from the disclosure regarding FIGS. 5A-5C above, one potential technique to mitigate the coupling between the finger contact 740 and display area routing segments 408 could be to provide display area compensation traces (not shown) interspersed with the display area routing segments 408. As explained above with regard to compensation traces 526, the display area compensation traces could be disconnected from any of the touch sensor electrodes 402, and as a result the coupling between finger contact 740 and routing traces 408 can be measured and isolated from the coupling between finger contact and touch sensor electrodes 402. In some examples, display area compensation segments can be formed form a non-transparent conductive material similar to the display area routing segments 408. It should be understood that similar principles to the compensation traces 526 described above, such as scaling of area of the display area routing segments 408 and the display area compensation traces can apply analogously to the display area compensation traces (not shown) as described herein.

In some examples, it may be desirable to forego the inclusion of display area compensation traces and/or provide additional compensation for finger crosstalk as will be described in more detail below with regard to FIGS. 7B-7C and 8-12.

FIGS. 7B and 7C illustrate an exemplary crosstalk relationship between touch panel electrodes 402 that can be used for global finger crosstalk compensation. A process for performing the global finger crosstalk compensation will be described in more detail below with regard to FIG. 8. The dashed lines from the touch sensor electrode 402 in the top left corner (e.g., row 1, column 1) each represent a coupling coefficient (or coefficients) that can be provided in the M×N matrix for the matrix corresponding to touch sensor electrode at position (i, j)=(1, 1). In some examples, the coefficients for electrodes upstream from the electrode at position (i, j)=(1, 1) indicated by dashed lines 720 (i, j)=(1, 2) and 726 (i, j)=(1, 4) can have a relatively large value as compared to more distant electrodes indicated by dashed lines 722 (i, j)=(4, 1) and 724 (i, j)=(4,4). FIG. 7C illustrates a similar set of dashed lines for a touch sensor electrode at position (i, j)=(2, 2). The dashed lines from the touch sensor electrode at position (i, j)=(2, 2) to each of the other touch sensor electrode positions can represent the M×N crosstalk coefficient values for the touch sensor at position (i, j)=(2, 2).

Figure 8:
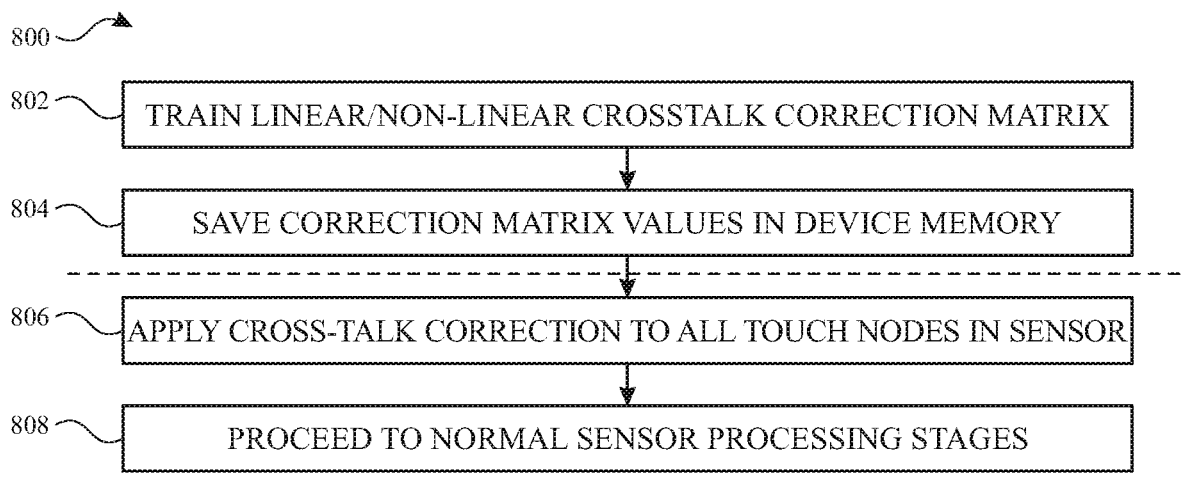
FIG. 8 illustrates an exemplary process for global finger crosstalk compensation according to examples of the disclosure.

FIG. 8 illustrates an exemplary process 800 for global finger crosstalk compensation according to examples of the disclosure. At step 802, a crosstalk correction matrix can be trained with coefficients that can be used to represent the crosstalk from each touch sensor electrode (e.g., 402 in FIGS. 4-6 above). In one example, a robot can be used to position a conductive object approximately sized and shaped like a finger successively above each touch sensor electrode 402. In some examples, the test object can also be positioned to characterize coupling of a user's grip to the panel routing segments (e.g., 408 in FIGS. 4-6 above). In some examples, for each measured position of the conductive object an image of touch can be obtained, and the coefficients for correction matrices can be produced based on the values obtained during the sequence of measurements performed at step 802. At step 804, the correction matrix values obtained during the training of step 802 can be stored in device memory of an electronic device that contains a touch sensor panel of the same design as the touch sensor panel used for matrix training. In some examples, the touch sensor panel included in the electronic device itself can be characterized during the training procedure. In some examples, a representative touch sensor panel with the same touch sensor electrode and routing design as the touch sensor panel included in the electronic device can be used to obtain the matrix coefficient values. Although testing each individual touch sensor panel may provide more accurate coefficients for the matrix, in some examples using a representative reference sample or reference samples of the same design can be sufficient to obtain crosstalk correction. In some examples, the stored matrix values can be global correction values. For example for an array of M×N touch sensor electrodes (e.g., having M number of rows and N number of columns) step 804 can store one M×N matrix of coefficients for every one of the touch sensor electrodes (e.g., a total number of stored M×N matrices equal to the number of touch sensor electrodes). The dashed line separating steps 804 and 806 indicates process steps 802 and 804 above the line can be performed before the electronic device is supplied to the user. Once the steps 802 and 804 have been performed, the stored matrix values in the device memory can be used to perform the subsequent steps 806 and 808. At step 806, the global crosstalk correction process 800 can apply crosstalk correction to all touch sensor electrodes in the touch sensor panel. In some examples, the M×N matrices for each touch sensor electrode can model a linear relationship for the finger crosstalk between electrodes. In such an example, the crosstalk correction can be performed by multiplying the inverse of each stored matrix to the measured touch sensor electrode values to obtain the correction factor for each touch sensor electrode position. In some examples, the M×N matrices for each touch sensor electrode can model a non-linear relationship for finger crosstalk between electrodes. In such an example, crosstalk correction can also be used to obtain a correction factor for each touch sensor electrode position. At step 806, the crosstalk correction factor can be used to remove the contribution of crosstalk from every touch sensor electrode position in the touch image. Once the crosstalk correction has been performed at step 806, the crosstalk corrected touch image can be used at step 808 for typical touch image processing, such as determining a touch input location. It should be understood that in the global crosstalk compensation process 800, the touch position does not need to be determined ahead of time to apply a crosstalk correction. Specifically, because a crosstalk relationship between every single touch sensor electrode to every other touch sensor electrode can be characterized by the matrices that are generated and stored at steps 802 and 804, respectively, the crosstalk correction can be performed on a panel-wide basis regardless of the touch input location.

As will be discussed in more detail below, in some examples, more localized matrices can be stored in device memory, and one of more of the localized matrices can be selected for crosstalk correction based on the determined touch location or locations. In addition, the crosstalk correction techniques disclosed herein can be applied when multiple objects are detected by the touch sensor panel. The use of localized matrices and the application of the correction techniques herein to the situation of multiple objects detected by the touch sensor panel will be described in more detail below with regard to FIGS. 9-12.

Figure 9A:
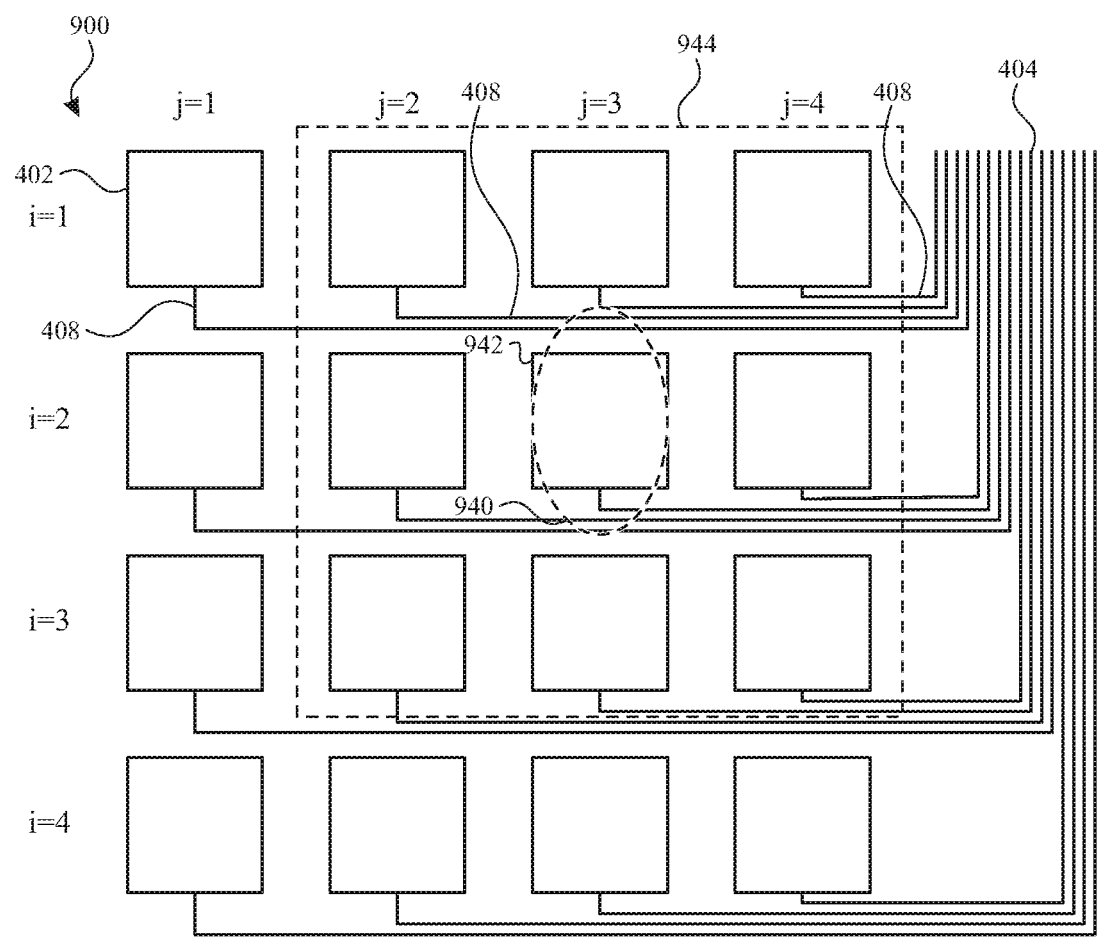
FIG. 9A-9B illustrates exemplary groupings of touch electrodes for performing localized finger crosstalk compensation according to examples of the disclosure.

FIG. 9A illustrates an exemplary localized grouping of touch electrodes for performing localized finger crosstalk compensation according to examples of the disclosure. In some examples, a localized grouping 944 of touch electrodes 402 in a nearby region to the finger location 940 may be selected based on detection of the finger location. In some examples, such as in the illustration of grouping 944, it can be expected for the finger contact 940 to couple to touch sensor electrodes immediately adjacent to the detected finger contact 940 location. As such, the localized grouping 944 for crosstalk elimination can include a patch of touch electrodes in proximity to the finger contact 940 location. In the illustrated figure, a 3×3 patch of touch electrodes 402 is shown, but a larger patch (e.g., 5×5) can be used without departing from the scope of the present disclosure. In addition, the patch of electrodes in the localized grouping need not be square shaped, and can be shaped as a rectangle, an approximation of other geometric shapes, irregular patterns of electrodes, or any grouping of touch electrodes. In some examples, the localized grouping 1404 can be selected specifically based on physical characteristics of the electrode pattern for the touch electrodes 402 and routing traces 408. For example, a different localized grouping 944 shape may be used for horizontal routing traces 408 as shown in FIG. 9 as compared to a sensor with vertical routing traces as shown in FIGS. 4B, 5C. In some examples, instead of a patch of electrodes surrounding the finger location 940, specific regions of a touch sensor panel can be used for crosstalk correction. For example, the panel may be divided into sub-sections (e.g., quadrants, upper/lower half, right/left half, central region and periphery, etc.) and when a finger location 940 is within one of those sub-sections, all of the touch electrodes within the sub-section can be identified for crosstalk correction. Similar to the patches described above, the use of sub-sections can also be referred to as a localized grouping 944. In some examples, one potential advantage of utilizing a localized grouping for crosstalk correction can be a reduction in the amount of memory usage for crosstalk reduction calculations. For example, in the description of FIGS. 8A and 8B, a crosstalk reduction scheme was described where each touch electrode 402 utilizes an M×N matrix of crosstalk coefficient values (e.g., one coefficient for each touch electrode in the panel). By using a localized grouping 944, a coefficient matrix loaded into memory for each touch electrode 402 may only contain a small number of coefficients corresponding to the size of the patch or sub-section of the localized grouping 944 discussed above. For example, during a training step to generate coefficient matrices for localized grouping 944 (e.g., training step 802 of process 800 above), a measurement robot can move a conductive probe across the entire area of the touch sensor panel, and the touch sensor nodes affected by crosstalk for each location of the probe can be determined experimentally. In such an example, different from what was described for process 800 above, matrices can be saved that include only coefficients for the determined affected touch sensor electrodes, which can have a significantly lower number of coefficients (e.g., equal to the number of touch sensor nodes 402 in the patch or sub-region) when compared to the M×N number of coefficients in each coefficient matrix used in process 800. In addition, different from what was described for process 800 above, since correction can be applied to only the affected touch sensor nodes 402, a total number of correction matrices utilized for correction can also be reduced from the M×N number of correction matrices.

Figure 9B:
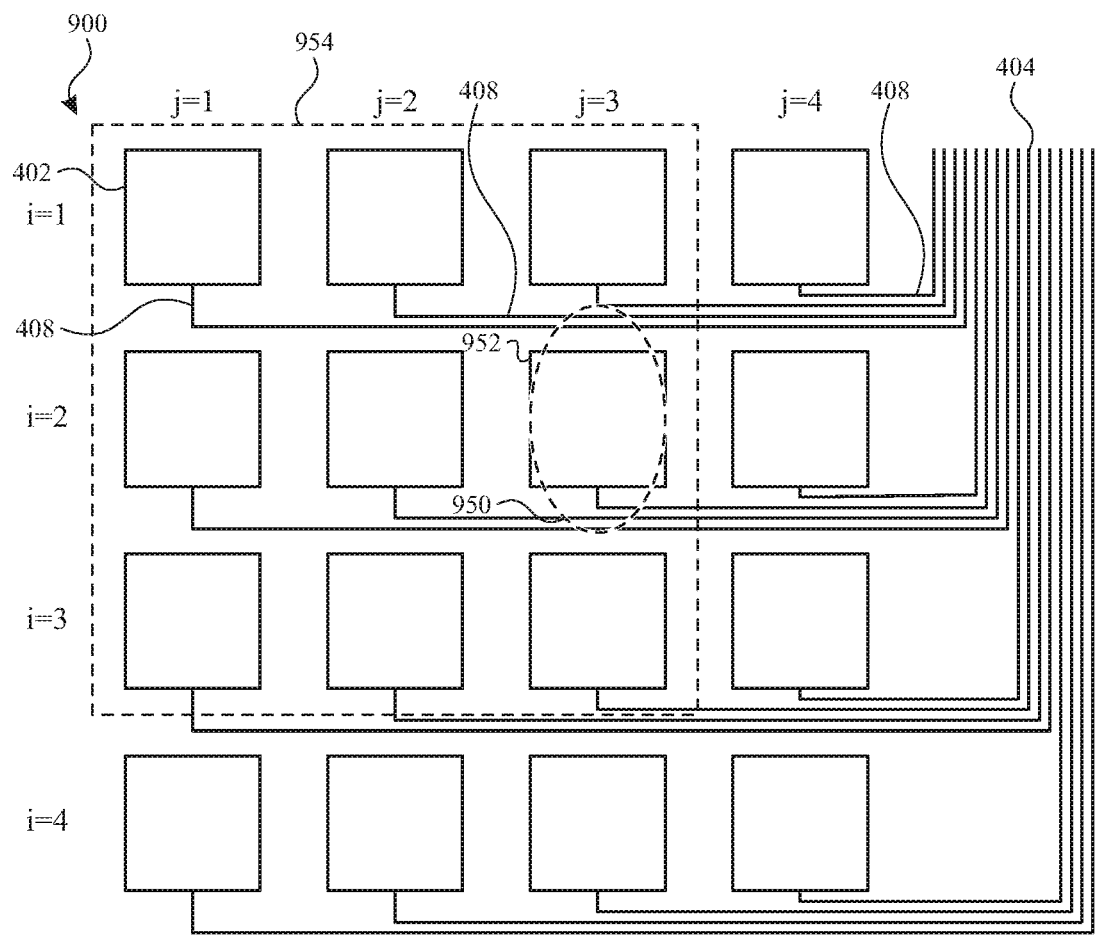

FIG. 9B illustrates a second exemplary localized grouping of touch electrodes for performing localized finger crosstalk compensation according to examples of the disclosure. In some examples, a downstream grouping 954 of touch electrodes 402 in a downstream relationship to the finger location 950 may be selected based on detection of the finger location. In some examples, as has been explained above with regard to FIG. 7A, it can be expected for the finger contact 940 to couple to traces 408 connected to downstream touch sensor electrodes 402. As such, the downstream grouping 954 for crosstalk elimination can include a patch of touch electrodes downstream from the finger location 950. In the example of FIG. 9B, the cross-talk correction region can extend to all touch sensor electrodes 402 downstream from the finger location 950 while excluding upstream touch sensor electrodes. For example, if the finger location 950 occurs in the second column j=2, the downstream grouping 954 may only include touch sensor electrodes in columns 1 and 2. It should be understood that a finger location 950 may not necessarily coincide exactly with a single touch sensor electrode 952, and the relative size of the illustrated finger location 950 relative to the size of the touch sensor electrode 402 may vary from the exemplary illustration shown which is not necessarily to scale. Accordingly, the exact dimensions of downstream grouping 954 illustrated in FIG. 9B should be understood to be merely exemplary, and variations in the size and shape of a downstream grouping remain within the scope of the present disclosure. For example, a small number of touch sensor electrodes 402 upstream from the finger location 950 may be included in the correction to account for uncertainty in the exact finger location as well as coupling between the finger and some upstream touch sensor electrodes 402 in close proximity to the touch location 950 that may contribute to erroneous touch measurements as a result of cross-talk. In some examples, the downstream grouping 954 can be selected specific to physical characteristics of the electrode pattern for the touch electrodes 402 and routing traces 408. For example, a different downstream grouping 954 shape (e.g., extending downstream in a horizontal direction) may be used for horizontal routing traces 408 as shown in FIG. 9B as compared to a sensor with vertical routing traces as shown in FIGS. 4B, 5C (e.g., the downstream grouping shape extending in a vertical direction. In some examples, the concept of using sub-regions for selecting which touch sensor electrodes 402 should have crosstalk correction performed on that can be extended to the idea of downstream groupings. For example, in the illustration of FIG. 9B, the finger location 950 in the upper-right quadrant can result in correction for the touch sensor electrodes upper right quadrant as well as the upper-left quadrant, which is downstream of the upper-right quadrant.

Figure 10:
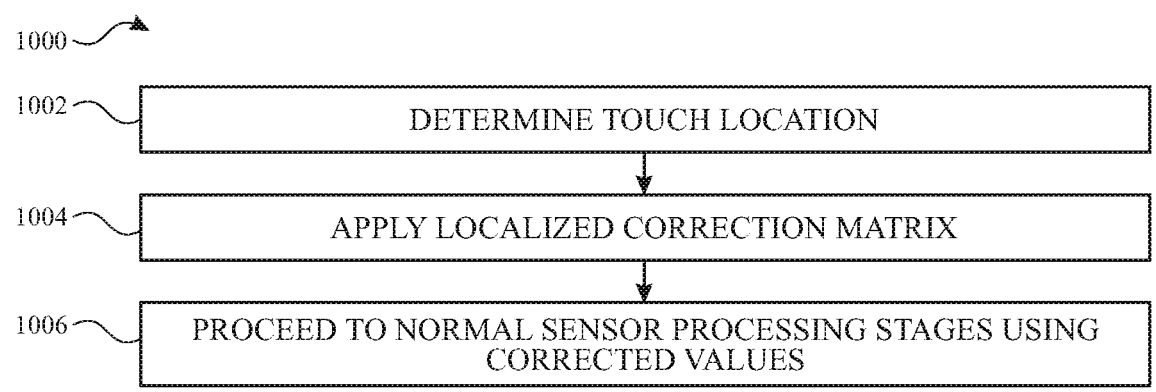
FIG. 10 illustrates an exemplary process for performing localized finger crosstalk compensation according to examples of the disclosure.

FIG. 10 illustrates an exemplary process 1000 for performing localized finger crosstalk compensation according to examples of the disclosure. At step 1002, process 1000 can determine a touch location based on a touch image that has not yet been corrected for a crosstalk contribution. At step 1004, localized correction matrices can be provided for crosstalk compensation of affected touch sensor electrodes determined based on the determined touch location and crosstalk correction can be performed based on the provided localized correction matrices. For example, a localized grouping 944 (which can include a patch, sub-region, or the like) of touch sensor electrodes as described with regard to FIG. 9A above or a downstream grouping 954 as described with regard to FIG. 9B above can be the basis for selecting which touch sensor nodes (e.g., 402 above) can be selected for performing crosstalk correction. In some examples, the possible set of matrices for the various crosstalk grouping can be pre-populated during a training process as described above with regard to step 802 of process 800. In some examples, selecting the matrices for crosstalk correction can be performed by providing the determined touch location to an index, wherein the index can include the locations of touch sensor electrodes and correction coefficients that were determined to be affected by a touch at or near the determined touch location during the training process described above with regard to FIG. 9A. In some examples, after the localized correction matrices have been applied and crosstalk correction has been performed based on the provided localized correction matrices at step 1004, the process 1000 can continue to normal touch sensor processing stages using the crosstalk corrected touch sensor measurement values at step 1006.

Figure 11:
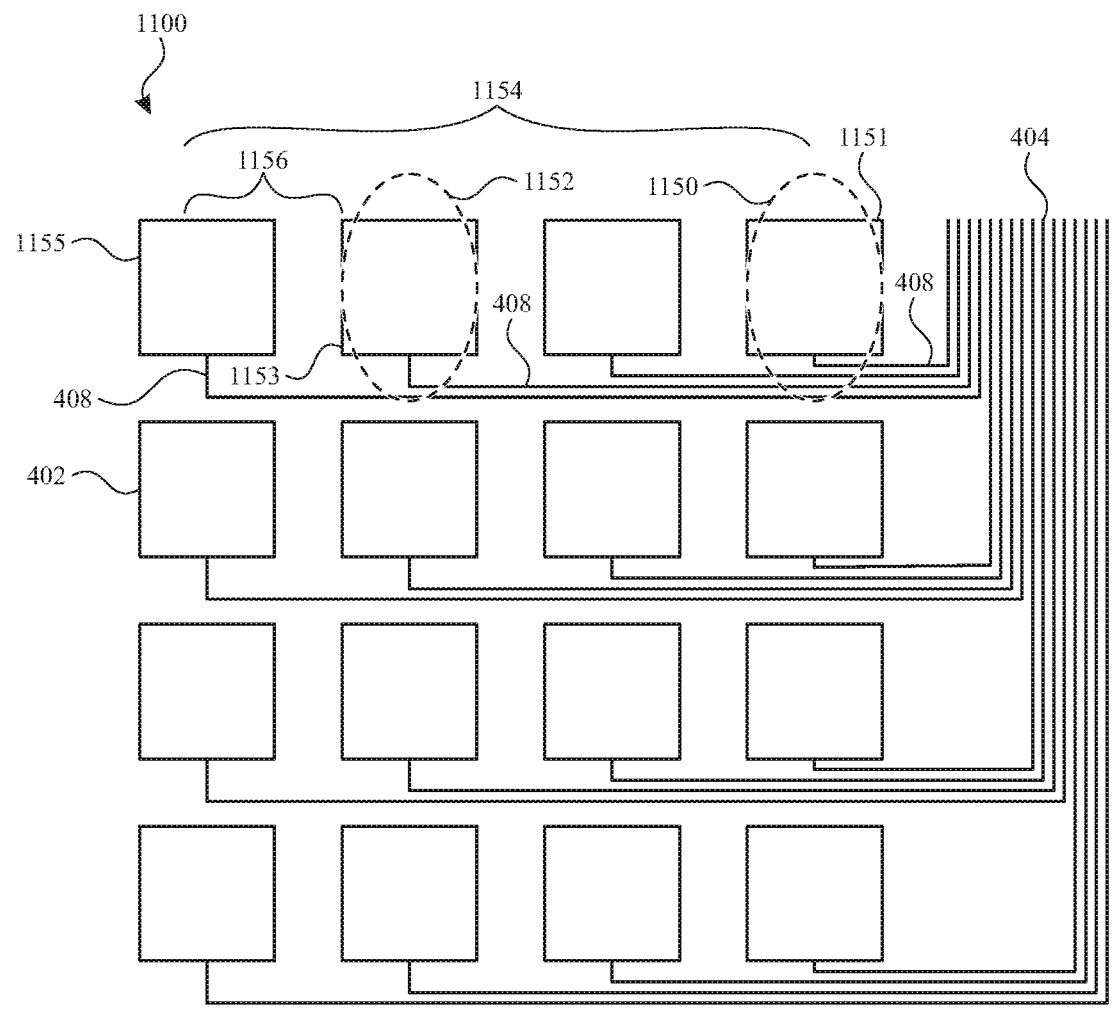
FIG. 11 illustrates an exemplary multi-touch finger input to a touch sensor panel that can utilize multi-finger crosstalk compensation according to examples of the disclosure.

FIG. 11 illustrates an exemplary multi-touch finger input to a touch sensor panel 1100 that can utilize multi-finger crosstalk compensation according to examples of the disclosure. In the illustrated example, two finger locations, first finger location 1150 and second finger location 1152 are illustrated in a single row of the touch sensor panel 1100. As illustrated, the first finger location 1150 coincides with the location of touch electrode 1151, which has several downstream touch electrodes 402 in the same row as indicated by the curly bracket 1154. In the illustrated example, one touch electrode 1155 at the far left edge of the first row of touch sensor electrodes is one of the downstream electrodes 1154 from the first finger location 1150. As illustrated, the second finger location 1152 coincides with the location of touch electrode 1153, which has a downstream touch electrode 1155 as indicated by curly bracket 1156. Thus, in some examples where multiple touches occur, one or more touch electrodes (e.g., touch electrode 1155 in the illustrated example) can be downstream from multiple finger locations simultaneously. In addition, the touch electrode 1153 is also a downstream electrode relative to the first finger location 1150 in the illustrated figure. Accordingly, this means that there can be a cross-talk component based on the first finger location 1150 included in the touch measurement associated with the touch sensor electrode 1153. In order to avoid over-correcting for the crosstalk contribution of the first finger location 1150, a cross-talk removal operation for each of the first finger location 1150 and second finger location 1152 can be performed starting from right to left in the illustrated example. In some examples, by first correcting the crosstalk from first finger location 1150, the cross-talk component of the touch contribution of first finger location 1150 can be removed from touch measurements corresponding to touch sensor electrodes 1155 and 1153. In some examples, the crosstalk from the second finger location 1152 can be removed based on the corrected measurement value of electrode 1153 that has been compensated for the crosstalk contribution from the finger location 1150. In some examples, if the order of compensation instead first compensates for the contribution from the second finger location 1152, the measurement signal of the touch sensor electrode 1153 used for the compensation will not have been corrected for a crosstalk contribution of the first finger location 1150. Accordingly, the compensation for the contribution from the second finger location 1152, if performed first, could also partially compensate for the crosstalk component of the first finger location 1150 in the downstream touch sensor electrode 1155. If the compensation for the contribution for the first finger location is subsequently performed as well, the downstream touch sensor electrode 1155 can be compensated for the crosstalk component first finger location 1150 twice, and overcompensation for the crosstalk of the first finger location can occur. It should be noted that in some examples, a multiple input from two or more fingers can be difficult to distinguish from a single input from a thumb or a small portion of a palm. Accordingly, additional training (e.g., as described regarding step 802 of process 800 or in conjunction with FIG. 9A) may be performed to determine an additional set of correction coefficient matrices for a larger contact that may or may not include multiple fingers. In some examples, a single large object correction may be used for the larger contact where multiple finger locations cannot be clearly distinguished or if there is ambiguity in the input.

Figure 12:
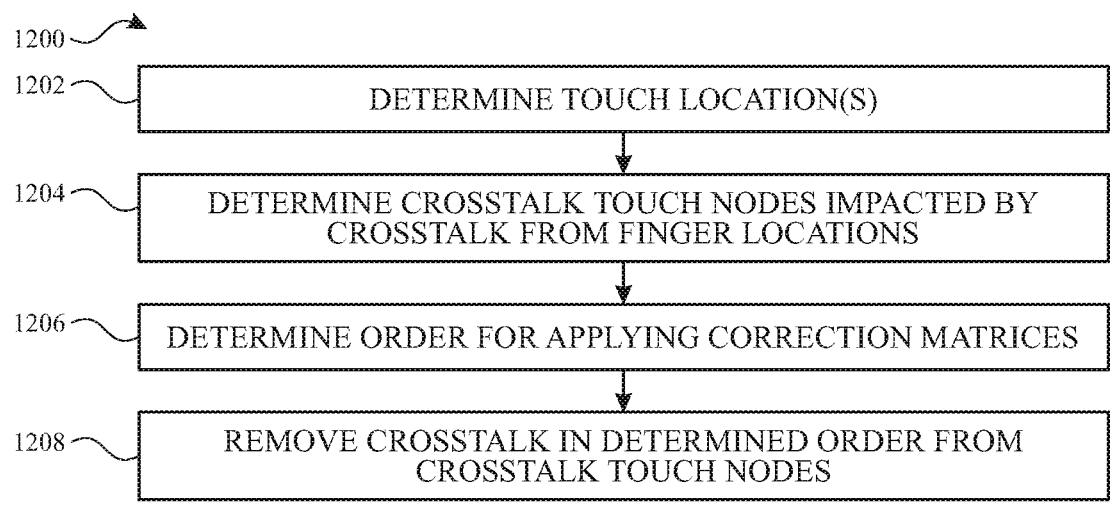
FIG. 12 illustrates an exemplary process for multi-touch finger crosstalk compensation according to examples of the disclosure.

FIG. 12 illustrates an exemplary process 1200 for multi-touch finger crosstalk compensation according to examples of the disclosure. In some examples, at step 1202, process 1200 can determine one or more touch locations based on proximate objects to the touch sensor panel such as a finger, stylus, or the like. In some examples, at step 1202 the process 1200 can determine that there are multiple objects touching or proximate to the touch sensor panel. In some examples, at step 1202 the process 1200 can also determine touch locations for the multiple detected objects. In some examples, at step 1204 the process 1200 can determine for each of the multiple object positions detected at step 1202, which touch sensor electrodes (e.g., touch nodes) of the touch sensor panel may be potentially impacted by crosstalk from the positions determined at step 1202. For example, if two objects are detected at step 1202, step 1204 can determine a first group of touch sensor electrodes potentially impacted by crosstalk from the first object position, and a second group of touch sensor electrodes potentially impacted by crosstalk from the second object position. For the sake of simplicity, the touch sensor electrodes potentially impacted by crosstalk from an object position will be described as crosstalk touch sensor electrodes. Accordingly, the first determined object position can be said to be associated with a first group of crosstalk touch sensor electrodes and the second determined object position can be associated with a second group of crosstalk touch sensor electrodes. In some examples, at step 1206, based on the determination of which touch sensor electrodes may be potentially impacted by crosstalk, an order for performing crosstalk removal can be determined. In the example with two object positions and two groups of crosstalk touch sensor electrodes described directly above, step 1206 can determine whether either of the determined object locations is included within the group of crosstalk touch sensor electrodes of another one of the determined object locations (e.g., as illustrated in the example of FIG. 11, where the touch sensor electrode 1153 is downstream of the first object location 1150). In some examples, if it is determined at step 1206 that there is no overlap between the first group of crosstalk touch sensor electrodes and the second group of crosstalk touch sensor electrodes, the process 1200 can determine an order for applying the correction matrices for crosstalk removal that is pre-determined and independent of the determination at step 1206. In some examples, if there is no overlap between the first group of crosstalk touch sensor electrodes as described above, the process 1200 can remove crosstalk from the crosstalk touch sensor electrodes related to the object locations in either order, or a predetermined order. In some examples, if it is determined that one or more touch object locations is within the group of crosstalk touch sensor electrodes of another of the touch object locations, step 1206 can generate a modified order for applying correction matrices for crosstalk removal. In some examples, removal of the crosstalk component associated with the most upstream object position (e.g., 1150 in FIG. 11) can be performed first from the crosstalk touch sensor electrodes related to the first object position. In some examples, the ordering for crosstalk removal of the crosstalk component associated with additional touches can proceed successively downstream (e.g., moving right to left for the horizontal routing configuration shown in FIG. 11) such that the farthest upstream finger location that has not yet been compensated is selected for each subsequent crosstalk compensation step. Accordingly, step 1208 can proceed iteratively to remove crosstalk for each finger location determined at step 1202 until crosstalk compensation for all of the determined finger locations has been performed. In some examples, at step 1202, multiple objects may be positioned closely to one another such that it may be difficult to determine whether two or more objects are present or whether a single larger object is present. In such an example, correction matrices that treat the input as a single large input may be used for such a detected input. In cases where an additional object is contacting the touch sensor panel in a location that is spaced away from the single large input, the multi-touch finger compensation of process 1200 can be applied between the large object and the additional object (or two large objects) without departing from the scope of the present disclosure.

Thus, according to the above, some examples of the disclosure are directed to a touch sensor panel comprising: touch sensor electrodes, panel routing segments, wherein each panel routing segment is electrically connected to one of the touch sensor electrodes and routed toward an edge region of the touch sensor panel, edge routing segments disposed in the edge region of the touch sensor panel, wherein each edge routing segment is electrically connected to a corresponding one of the panel routing segments, wherein the edge routing segments are electrically connected to first sensing circuitry, compensation traces interspersed within the edge routing segments, wherein the compensation traces are electrically connected to second sensing circuitry and electrically disconnected from the panel and edge routing segments of the touch sensor panel, and circuitry configured to receive touch sensor outputs from the first sensing circuitry and a compensation output from the second sensing circuitry and configured to compensate the touch sensor outputs based on the compensation output. Additionally or alternatively to one or more of the examples disclosed above, in some examples, the touch sensor electrodes are arranged in a pattern of rows and columns, wherein a number of the compensation traces is equal to a number of rows of the pattern of rows and columns. Additionally or alternatively to one or more of the examples disclosed above, in some examples, the touch sensor electrodes are arranged in a pattern of rows and columns, wherein a number of the compensation traces is equal to a number of columns of the pattern of rows and columns. Additionally or alternatively to one or more of the examples disclosed above, in some examples, the compensation at the circuitry comprises scaling the compensation output based on a first area ratio between an area of a first compensation trace corresponding to the compensation output and an area of a corresponding first edge routing segment corresponding to a first touch sensor output. Additionally or alternatively to one or more of the examples disclosed above, in some examples, the compensation at the compensation circuitry further comprises scaling the compensation output based on a second area ratio between the area of the first compensation trace corresponding to the compensation output and an area of a corresponding second edge routing segment corresponding to a second touch sensor output, wherein the first area ratio and the second area ratio are different. Additionally or alternatively to one or more of the examples disclosed above, in some examples, the first edge routing segment is coupled by a first panel routing segment to a first touch sensor electrode and the second edge routing segment is coupled by a second panel routing segment to a second touch sensor electrode, wherein the first touch sensor electrode and the second touch sensor electrode are included in a same row of the touch sensor panel. Additionally or alternatively to one or more of the examples disclosed above, in some examples, a spacing between a first compensation trace and a first and second edge routing segment adjacent to the first compensation trace is equal to a spacing between a second edge routing segment and a third edge routing segment adjacent to the second edge routing segment. Additionally or alternatively to one or more of the examples disclosed above, in some examples, the touch sensor panel further comprises a shielding conductor adjacent a first edge routing segment of the edge routing segments, wherein a spacing between the first edge routing segment and the shielding conductor is equal to a spacing between the first edge routing segment and a second edge routing segment adjacent to the first edge routing segment, wherein the first and second edge routing segments are electrically connected to a first touch sensor electrode and a second touch sensor electrode, respectively. Additionally or alternatively to one or more of the examples disclosed above, in some examples, the touch sensor electrodes are arranged in a pattern of rows and columns, and the panel routing segments are divided into a first group of panel routing segments and a second group of panel routing segments, the first group of panel routing segments disposed in a first routing channel between a first row and a second row adjacent to the first row of the pattern of rows and column, and the second group of panel routing segments disposed between the second row and a third row adjacent to the second row of the pattern of rows and columns.

Some examples of the disclosure are directed to a method comprising: receiving a plurality of measurement values from a plurality of touch sensor electrodes of a touch sensor panel, receiving a plurality of crosstalk correction matrices for the plurality of touch sensor electrodes of the touch sensor panel, the crosstalk correction matrices containing coefficients indicative of an amount of crosstalk between touch sensor electrodes of the touch sensor panel, applying the crosstalk correction matrices to the plurality of measurement values from the plurality of touch sensor electrodes of the touch sensor panel to produce compensated measurement values. Additionally or alternatively to one or more of the examples disclosed above, in some examples, the plurality of crosstalk correction matrices includes a number of crosstalk matrices equal to a number of touch sensor electrodes in the plurality of touch sensor electrodes of the touch sensor panel, and each crosstalk correction matrix includes a number of coefficients equal to the number of touch sensor electrodes in the plurality of touch sensor electrodes of the touch sensor panel. Additionally or alternatively to one or more of the examples disclosed above, in some examples, the method further comprises prior to receiving the plurality of crosstalk correction matrices, determining a first object location based on the plurality of measurement values from the plurality of touch sensor electrodes of the touch sensor panel, and determining a plurality of crosstalk touch sensor electrodes based on the first object location, wherein the plurality of crosstalk correction matrices correspond to the crosstalk touch sensor electrodes. Additionally or alternatively to one or more of the examples disclosed above, in some examples, each crosstalk correction matrix includes a number of coefficients less than the number of touch sensor electrodes in the plurality of touch sensor electrodes of the touch sensor panel. Additionally or alternatively to one or more of the examples disclosed above, in some examples, the method further comprises determining a second object location based on the plurality of measurement values from the plurality of touch sensor electrodes of the touch sensor panel, and determining an order for performing crosstalk correction based on the relative position of the first object location and the second object location. Additionally or alternatively to one or more of the examples disclosed above, in some examples, determining the order for performing crosstalk correction based on the relative position of the first object location and the second object location comprises determining which of the first and second object is in a most upstream location relative to crosstalk interaction among the plurality of touch sensor electrodes. Additionally or alternatively to one or more of the examples disclosed above, in some examples, the method further comprises in accordance with a determination that the first object location is upstream from the second object location, first performing a first crosstalk correction for the first object location using the plurality of crosstalk matrices, and subsequently performing a second crosstalk correction for the second object location.

In a touch sensor panel having touch sensor electrodes electrically connected to panel routing segments routed to an edge region of the touch sensor panel and edge routing segments in the edge region electrically connected to the panel routing segments, some examples of the disclosure are directed to a method for compensating the touch sensor panel, comprising: obtaining touch sensor outputs from the edge routing segments; generating one or more compensation outputs indicative of an amount of capacitive coupling between an object and at least one of the edge routing segments in the edge region; and compensating the touch sensor outputs based on the one or more compensation outputs. Additionally or alternatively to one or more of the examples disclosed above, in some examples, the method further comprises generating the one or more compensation outputs from one or more compensation traces interspersed within the edge routing segments and electrically disconnected from the panel and edge routing segments. Additionally or alternatively to one or more of the examples disclosed above, in some examples, the method further comprises arranging the touch sensor electrodes in a pattern of rows and columns, and interspersing a first number of the one or more compensation traces within the edge routing segments, the first number equal to a number of rows in the pattern. Additionally or alternatively to one or more of the examples disclosed above, in some examples, the method further comprises arranging the touch sensor electrodes in a pattern of rows and columns, and interspersing a first number of the one or more compensation traces within the edge routing segments, the first number equal to a number of columns in the pattern. Additionally or alternatively to one or more of the examples disclosed above, in some examples, the method further comprises scaling a first compensation output based on a first area ratio between an area of a first compensation trace corresponding to the first compensation output and an area of a corresponding first edge routing segment corresponding to a first touch sensor output. Additionally or alternatively to one or more of the examples disclosed above, in some examples, the method further comprises scaling the first compensation output based on a second area ratio between the area of the first compensation trace corresponding to the first compensation output and an area of a corresponding second edge routing segment corresponding to a second touch sensor output, wherein the first area ratio and the second area ratio are different. Additionally or alternatively to one or more of the examples disclosed above, in some examples, the method further comprises coupling the first edge routing segment to a first touch sensor electrode by a first panel routing segment and coupling the second edge routing segment to a second touch sensor electrode by a second panel routing segment, wherein the first touch sensor electrode and the second touch sensor electrode are included in a same row of the touch sensor panel. Additionally or alternatively to one or more of the examples disclosed above, in some examples, the method further comprises equating a spacing between a first compensation trace and a first and second edge routing segment adjacent to the first compensation trace to a spacing between a second edge routing segment and a third edge routing segment adjacent to the second edge routing segment. Additionally or alternatively to one or more of the examples disclosed above, in some examples, the method further comprises forming a shielding conductor adjacent a first edge routing segment of the edge routing segments, wherein a spacing between the first edge routing segment and the shielding conductor is equal to a spacing between the first edge routing segment and a second edge routing segment adjacent to the first edge routing segment, wherein the first and second edge routing segments are electrically connected to a first touch sensor electrode and a second touch sensor electrode, respectively. Additionally or alternatively to one or more of the examples disclosed above, in some examples, the method further comprises arranging the touch sensor electrodes in a pattern of rows and columns; and dividing the panel routing segments into a first group of panel routing segments and a second group of panel routing segments, the first group of panel routing segments disposed in a first routing channel between a first row and a second row adjacent to the first row of the pattern of rows and column, and the second group of panel routing segments disposed between the second row and a third row adjacent to the second row of the pattern of rows and columns. Some examples of the disclosure are directed to a non-transitory computer readable storage medium. The non-transitory computer readable storage medium can store instructions, which when executed by a device comprising a touch sensor panel (e.g., including touch sensor electrodes, panel routing segments, and edge routing segments) and one or more processing circuits, can cause the device to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
    touch sensor electrodes;
    panel routing segments, wherein each panel routing segment is electrically connected to one of the touch sensor electrodes and routed toward an edge region of the touch sensor panel;
    edge routing segments disposed in the edge region of the touch sensor panel, wherein each edge routing segment is electrically connected to a corresponding one of the panel routing segments, wherein the edge routing segments are electrically connected to first sensing circuitry;
    compensation traces interspersed within the edge routing segments, wherein the compensation traces are electrically connected to second sensing circuitry and electrically disconnected from the panel and edge routing segments of the touch sensor panel, and wherein the compensation traces include a first compensation trace and a second compensation trace, the first compensation trace interspersed within a first plurality of the edge routing segments and having a first length, and the second compensation trace interspersed within a second plurality of the edge routing segments different from the first plurality of edge routing segments and having a second length different from the first length; and
    circuitry configured to receive touch sensor outputs from the first sensing circuitry and a compensation output from the second sensing circuitry and configured to compensate the touch sensor outputs based on the compensation output.

2. The touch sensor panel of claim 1, wherein the touch sensor electrodes are arranged in a pattern of rows and columns, wherein a number of the compensation traces is equal to a number of rows of the pattern of rows and columns.

3. The touch sensor panel of claim 1, wherein the touch sensor electrodes are arranged in a pattern of rows and columns, wherein a number of the compensation traces is equal to a number of columns of the pattern of rows and columns.

4. The touch sensor panel of claim 1, wherein the compensation at the circuitry comprises scaling the compensation output based on a first area ratio between an area of the first compensation trace corresponding to the compensation output and an area of a corresponding first edge routing segment corresponding to a first touch sensor output.

5. The touch sensor panel of claim 4, wherein the compensation at the compensation circuitry further comprises scaling the compensation output based on a second area ratio between the area of the first compensation trace corresponding to the compensation output and an area of a corresponding second edge routing segment corresponding to a second touch sensor output, wherein the first area ratio and the second area ratio are different.

6. The touch sensor panel of claim 5, wherein the first edge routing segment is coupled by a first panel routing segment to a first touch sensor electrode and the second edge routing segment is coupled by a second panel routing segment to a second touch sensor electrode, wherein the first touch sensor electrode and the second touch sensor electrode are included in a same row of the touch sensor panel.

7. The touch sensor panel of claim 1, wherein a spacing between the first compensation trace and a first and second edge routing segment adjacent to the first compensation trace is equal to a spacing between a second edge routing segment and a third edge routing segment adjacent to the second edge routing segment.

8. The touch sensor panel of claim 1, further comprising a shielding conductor adjacent a first edge routing segment of the edge routing segments, wherein a spacing between the first edge routing segment and the shielding conductor is equal to a spacing between the first edge routing segment and a second edge routing segment adjacent to the first edge routing segment, wherein the first and second edge routing segments are electrically connected to a first touch sensor electrode and a second touch sensor electrode, respectively.

9. The touch sensor panel of claim 1, wherein:
    the touch sensor electrodes are arranged in a pattern of rows and columns; and
    the panel routing segments are divided into a first group of panel routing segments and a second group of panel routing segments, the first group of panel routing segments disposed in a first routing channel between a first row and a second row adjacent to the first row of the pattern of rows and column, and the second group of panel routing segments disposed between the second row and a third row adjacent to the second row of the pattern of rows and columns.

10. In a touch sensor panel having touch sensor electrodes electrically connected to panel routing segments routed to an edge region of the touch sensor panel, edge routing segments in the edge region electrically connected to the panel routing segments, and compensation traces interspersed within the edge routing segments, wherein the compensation traces are electrically disconnected from the panel and edge routing segments of the touch sensor panel, and wherein the compensation traces include a first compensation trace and a second compensation trace, the first compensation trace interspersed within a first plurality of the edge routing segments and having a first length, and the second compensation trace interspersed within a second plurality of the edge routing segments different from the first plurality of edge routing segments and having a second length different from the first length, a method for compensating the touch sensor panel, comprising:
   obtaining touch sensor outputs from the edge routing segments;
   generating one or more compensation outputs from the compensation traces indicative of an amount of capacitive coupling between an object and at least one of the edge routing segments in the edge region; and
   compensating the touch sensor outputs based on the one or more compensation outputs.

11. The method of claim 10, further comprising:
arranging the touch sensor electrodes in a pattern of rows and columns, and
interspersing a first number of the one or more compensation traces within the edge routing segments, the first number equal to a number of rows in the pattern.

12. The method of claim 10, further comprising:
arranging the touch sensor electrodes in a pattern of rows and columns, and
interspersing a first number of the one or more compensation traces within the edge routing segments, the first number equal to a number of columns in the pattern.

13. The method of claim 10, further comprising scaling a first compensation output based on a first area ratio between an area of the first compensation trace corresponding to the first compensation output and an area of a corresponding first edge routing segment corresponding to a first touch sensor output.

14. The method of claim 13, further comprising scaling the first compensation output based on a second area ratio between the area of the first compensation trace corresponding to the first compensation output and an area of a corresponding second edge routing segment corresponding to a second touch sensor output, wherein the first area ratio and the second area ratio are different.

15. The method of claim 14, wherein the first edge routing segment is coupled to a first touch sensor electrode by a first panel routing segment and the second edge routing segment is coupled to a second touch sensor electrode by a second panel routing segment, wherein the first touch sensor electrode and the second touch sensor electrode are included in a same row of the touch sensor panel.

16. The method of claim 10, wherein a spacing between the first compensation trace and a first and second edge routing segment adjacent to the first compensation trace is equal to a spacing between a second edge routing segment and a third edge routing segment adjacent to the second edge routing segment.

17. The method of claim 10, the touch sensor panel further comprising a shielding conductor adjacent a first edge routing segment of the edge routing segments, wherein a spacing between the first edge routing segment and the shielding conductor is equal to a spacing between the first edge routing segment and a second edge routing segment adjacent to the first edge routing segment, wherein the first and second edge routing segments are electrically connected to a first touch sensor electrode and a second touch sensor electrode, respectively.

18. The method of claim 10, wherein the touch sensor panel further comprising:
   the touch sensor electrodes arranged in a pattern of rows and columns; and
   the panel routing segments divided into a first group of panel routing segments and a second group of panel routing segments, the first group of panel routing segments disposed in a first routing channel between a first row and a second row adjacent to the first row of the pattern of rows and column, and the second group of panel routing segments disposed between the second row and a third row adjacent to the second row of the pattern of rows and columns.

19. A non-transitory computer readable storage medium storing instructions, which when executed by a device comprising one or more processing circuits and a touch sensor panel including touch sensor electrodes, panel routing segments, edge routing segments, and compensation traces interspersed within the edge routing segments, wherein the compensation traces are electrically disconnected from the panel and edge routing segments of the touch sensor panel, and wherein the compensation traces include a first compensation trace and a second compensation trace, the first compensation trace interspersed within a first plurality of the edge routing segments and having a first length, and the second compensation trace interspersed within a second plurality of the edge routing segments different from the first plurality of edge routing segments and having a second length different from the first length, cause the device to perform a method for compensating the touch sensor panel, the method comprising:
   obtaining touch sensor outputs from the edge routing segments in an edge region;
   generating one or more compensation outputs from the compensation traces indicative of an amount of capacitive coupling between an object and at least one of the edge routing segments in the edge region; and
   compensating the touch sensor outputs based on the one or more compensation outputs.

20. The touch sensor panel of claim 1, wherein first length is between a shortest and longest length of the first plurality of edge routing segments, and second length is between a shortest and longest length of the second plurality of edge routing segments.

21. The touch sensor panel of claim 1, wherein compensating the touch sensor outputs based on the compensation output comprises:
   compensating a first plurality of the touch electrodes electrically connected to a first plurality of the routing segments with the compensation output corresponding to the first compensation trace; and
   compensating a second plurality of the touch electrodes electrically connected to a second plurality of the routing segments with the compensation output corresponding to the second compensation trace.

* * * * *